United States Patent
Filip et al.

(10) Patent No.: US 12,145,698 B2
(45) Date of Patent: Nov. 19, 2024

(54) METHODS AND SYSTEMS FOR FREE-FLOATING NAUTICAL STATIONKEEPING

(71) Applicant: Lone Gull Holdings, Ltd., Portland, OR (US)

(72) Inventors: Grzegorz Filip, Ann Arbor, MI (US); Bradley Beeksma, Kailua, HI (US)

(73) Assignee: Lone Gull Holdings, Ltd., Portland, OR (US)

( * ) Notice: Subject to any disclaimer, the term of this patent is extended or adjusted under 35 U.S.C. 154(b) by 0 days.

(21) Appl. No.: 18/388,746

(22) Filed: Nov. 10, 2023

(65) Prior Publication Data
US 2024/0158057 A1     May 16, 2024

Related U.S. Application Data

(60) Provisional application No. 63/425,027, filed on Nov. 14, 2022.

(51) Int. Cl.
| | |
|---|---|
| *B63B 35/44* | (2006.01) |
| *B63B 39/00* | (2006.01) |
| *B63H 1/14* | (2006.01) |
| *F03B 13/14* | (2006.01) |
| *F03D 9/30* | (2016.01) |

(52) U.S. Cl.
CPC ............ *B63B 35/44* (2013.01); *B63B 39/005* (2013.01); *B63H 1/14* (2013.01); *F03B 13/14* (2013.01); *F03D 9/30* (2016.05); *B63B 2035/446* (2013.01); *B63B 2035/4466* (2013.01); *F05B 2220/705* (2020.08)

(58) Field of Classification Search
CPC . B63B 35/44; B63B 39/005; B63B 2035/446; B63B 2035/4466; B63H 1/14; F03B 13/14; F03B 13/20; F03D 9/30; F03D 9/008; F03D 13/25; F05B 2220/705; Y02E 10/30
USPC ........... 290/42, 43, 53, 54; 60/498, 499, 501
See application file for complete search history.

(56) References Cited

U.S. PATENT DOCUMENTS

| | | | |
|---|---|---|---|
| 6,097,104 A * | 8/2000 | Russell | F03D 9/25 |
| | | | 290/55 |
| 8,492,921 B2 * | 7/2013 | Douglas | F03D 1/0601 |
| | | | 290/43 |
| 2009/0058091 A1 * | 3/2009 | Douglas | F03D 3/002 |
| | | | 290/53 |
| 2011/0309624 A1 * | 12/2011 | Ettanoor Thuppale | F03B 3/18 |
| | | | 415/1 |
| 2022/0056880 A1 * | 2/2022 | Sheldon-Coulson | F03D 9/19 |

* cited by examiner

*Primary Examiner* — Hoang M Nguyen
(74) *Attorney, Agent, or Firm* — Fulwider Patton LLP; Michael J. Moffatt, Esq.

(57) ABSTRACT

Methods and systems are provided for nautical stationkeeping of free-floating objects. In one example, a method includes adjusting translational motion of a body freely floating in water by rotating the body. The translational motion may be adjusted, for instance, to maintain the body within a geographic area. In certain examples, the adjustment of the translational motion may be realized via a Magnus effect induced by rotating the body. The body may be configured as, for example, a free-floating object such as a wave engine.

10 Claims, 26 Drawing Sheets

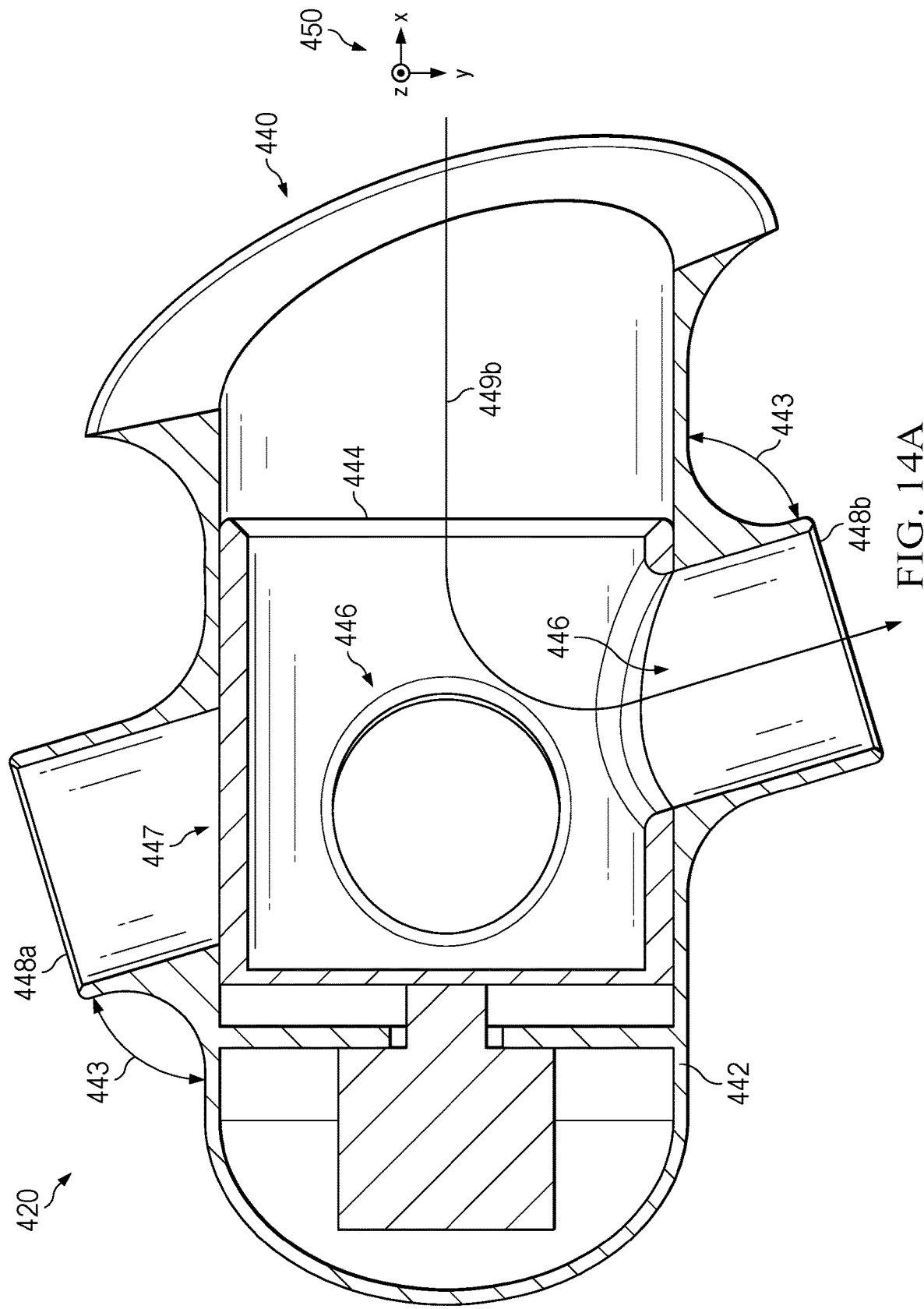

METHODS AND SYSTEMS FOR FREE-FLOATING NAUTICAL STATIONKEEPING

CROSS-REFERENCES TO RELATED APPLICATIONS

This application claims priority to U.S. Ser. No. 63/425,027, filed Nov. 14, 2022, the content of which is incorporated by reference herein in its entirety.

FIELD

Embodiments of the subject matter disclosed herein relate to nautical stationkeeping, and more particularly to nautical stationkeeping for free-floating wave engines.

BACKGROUND

At least due to largescale effects on climate, the terrestrial biosphere, and public health, it is desirable to reduce dependence on less sustainable forms of energy generation. To do so, in general, it is desirable to maximize net energy output while limiting implementation, operational, and maintenance costs. One possible source of virtually limitless energy (e.g., one or more energy resources with an aggregate scale greatly exceeding global human energy consumption) includes energy generated by oceanic waves.

For example, a system may freely float on ocean surface waters and capture energy from oscillatory translational motion induced by ocean waves. The system may convert the captured wave energy into energy products (e.g., chemical fuels that store the energy and may be transported and/or accessed for consumption, and/or provided to climate services that use the energy on-site). Ensuring that such a system is economically practical and environmentally sustainable at production scales may be beneficial.

BRIEF DESCRIPTION OF THE DRAWINGS

Various embodiments and techniques will be described with reference to the drawings, in which:

FIG. 14A shows a cross-sectional view of the extension of FIG. 11 configured in a second position;

DETAILED DESCRIPTION

Figure 1:
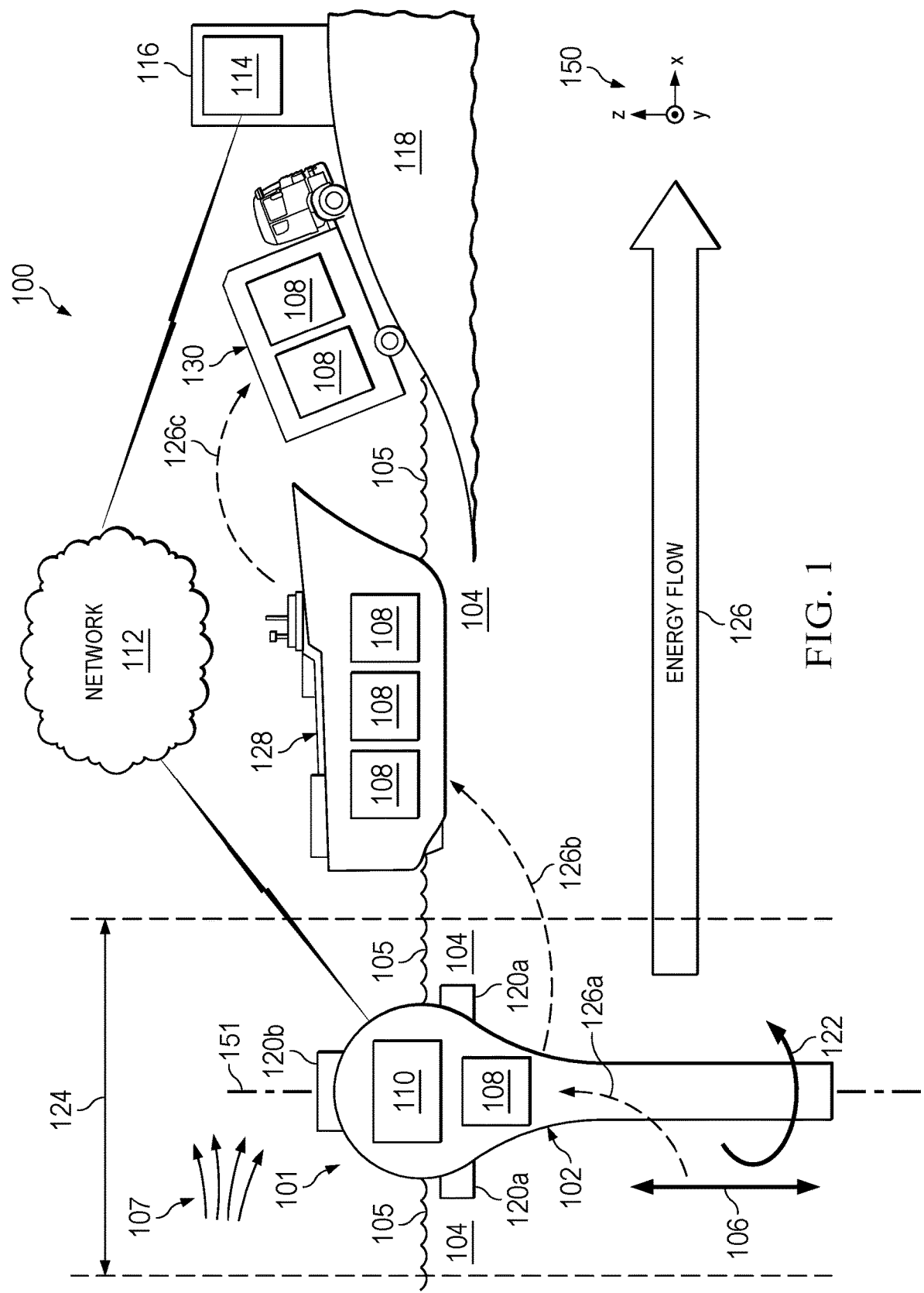
FIG. 1 shows a schematic diagram of a wave energy harvesting system.

Techniques described and suggested herein include methods and apparatus, the method including adjusting translational motion of a rotationally symmetric body freely floating in water by rotating the rotationally symmetric body.

In at least one embodiment, a system may include a rotationally symmetric body, wherein a rotational symmetry of the rotationally symmetric body may be defined with respect to a central rotational axis of the rotationally symmetric body, a reservoir housed within the rotationally symmetric body, the reservoir configured to maintain buoyancy of the rotationally symmetric body relative to a surface of water, and one or more extensions outwardly protruding from the rotationally symmetric body, the one or more extensions configured to induce rotation of the rotationally symmetric body about the central rotational axis to adjust translational motion of the rotationally symmetric body along the surface of water.

In at least one embodiment, a wave engine may include a quasi-cylindrical body rotationally symmetric about a central, vertical rotational axis, a pair of outlet ports positioned on opposite sides of the quasi-cylindrical body and configured so as to controllably release water from within the quasi-cylindrical body in two opposing, parallel directions, and one or more processors storing executable instructions in non-transitory memory which, if executed by the one or more processors, may cause the wave engine to receive, from a remote land-based controller, an indication to adjust a direction of translational motion of the wave engine along a surface of water on which the wave engine floats so as to maintain the wave engine within a geographic area, and adjust an amount of water released from the pair of outlet ports to induce rotation of the quasi-cylindrical body, where the induced rotation may generate a Magnus effect which results in a lift force which adjusts the direction of the translational motion according to the indication.

These, as well as other aspects, advantages, and alternatives will become apparent to those of ordinary skill in the art by reading the following detailed description, with reference where appropriate to the accompanying drawings. Further, it should be understood that descriptions and figures provided herein are intended to illustrate the invention by way of example only and, as such, that numerous variations are possible.

For example, the following description relates to various embodiments of systems and methods for a floatable watercraft, device, or other apparatus which self-sustains a position (e.g., to within a given geographic area or radius; also referred to herein as "stationkeeping") on a body of water. For instance, a wave engine may be configured for self-propulsion such that the wave engine may not travel outside of a predefined or expected geographic area. In such an example, the wave engine may capture energy from oceanic or other wind-induced water waves and harness the captured energy to induce self-propulsion. Accordingly, in at least one embodiment, "self-propulsion" may refer to propulsion of a floatable watercraft, device, or other apparatus without extracting or otherwise drawing energy from a stored fuel.

In an example embodiment, stationkeeping of a floatable watercraft, device, or other apparatus, such as a wave engine, may include defining a geographic area within, or a geographic path along, which the floatable watercraft, device, or other apparatus may move or otherwise translate in physical space. In one example of stationkeeping, a geographic area or path may be defined which corresponds to a specific physical area in which a wave engine may move or otherwise translate over a given duration (e.g., a year). In certain cases, the geographic area or path may be periodically or temporarily altered based on a given set of conditions, such as accessibility to the wave engine, meteorological data, transient obstructions, etc. Such stationkeeping may be executed dynamically, e.g., via an onboard controller or a remote system, or via a remote operator entering commands to be executed.

Stationkeeping may be defined at varying scales and with varying geographic configurations. As an example, the geographic area may be defined to have a largest extent of up to 500 miles (e.g., a diameter of 500 miles). As another example, the geographic area may be a path partially or fully extending around the Earth, e.g., within a distance of a single latitude (such as 60° south, which passes through no land). For a wave engine, the geographic area may additionally or alternatively be selected for relatively high winds and water waves so as to provide access to correspondingly high amounts of capturable energy.

In certain embodiments, stationkeeping may be utilized to prevent mechanical damage to the floatable watercraft, device, or other apparatus, e.g., from other watercraft, land features, etc. As such, the geographic area or path may be judiciously selected to avoid fixed features or highly trafficked areas. In one example, the floatable watercraft, device, or other apparatus may be tethered to a bed beneath the body of water (e.g., the ocean floor, a lake bed, etc.) upon which the floatable watercraft, device, or other apparatus is floating. Similarly, in another example, the floatable watercraft, device, or other apparatus may be tethered to a mooring fixed in position so as to restrict free movement of the floatable watercraft, device, or other apparatus. However, such tethering may be practically unfeasible, at least because lengthy (e.g., >5 km) lines may be utilized in areas with relatively high water depth and excess structural reinforcement may be implemented to maintain integrity of the line and the floatable watercraft, device, or other apparatus during extreme meteorological conditions. Similarly, moorings may be economically impractical to implement at a production scale. Moreover, when multiple such floatable watercraft, devices, or other apparatuses are maintained in a given area, tethering of one floatable watercraft, device, or other apparatus may obstruct the other floatable watercrafts, devices, or other apparatuses and/or other vessels.

Additionally or alternatively, the floatable watercraft, device, or other apparatus may periodically move (e.g., away from the geographic area in which stationkeeping is being executed) during certain operations. For example, a wave engine may move along a surface of the body of water so as to exchange an energy product (e.g., fuel, removed carbon, minerals, etc.) or information (e.g., data stored on one or more onboard hard drives) with another wave engine, a tanker ship or other transport, a deployment ship, etc., or to be serviced. At least for the reasons provided hereinabove, it may be advantageous for the wave engine to remain untethered.

In at least one embodiment provided herein, a free-floating wave engine may utilize a combination of captured energy and ambient environmental forces, such as winds and water waves, to self-propel between locations or to dynamically maintain geographic position for stationkeeping. However, to capture and store as much net energy as possible, e.g., in production-scale wave engines, it may be desirable to limit an amount of captured energy which is applied to propulsion.

In an example embodiment, self-propulsion of the wave engine may be driven, at least in part, by the Magnus effect (also referred to herein as "Magnus effect propulsion"). The Magnus effect may generate a force which results in an adjustment to, or an alteration of, translational motion of the wave engine. Specifically, the wave engine may be configured as, and/or configured to include, a rigid cylindrical (or quasi-cylindrical) body, rotation of which may generate a Magnus effect manifested as localized low- and high-pressure areas of water. If there is preexisting motion relative to water on which the wave engine floats (e.g., from one or more ambient environmental forces, such as wind and/or water waves, and/or an auxiliary translational propellor), the Magnus effect may result in a force which may move the wave engine relative to (e.g., perpendicular to) such preexisting motion. Advantageously, by dynamically adjusting a rotational speed and/or a rotational direction of the rotating wave engine, e.g., responsive to one or more forces applied to the wave engine, controlled translational movement of the wave engine may be realized with relatively low energy input.

In additional, alternative, or otherwise modified embodiments to those described above and in detail below with reference to FIGS. 1-21D, one or more components of the wave engine may be added, removed, substituted, modified, or interchanged to adapt the wave engine for a given use case. Certain embodiments, for example, may represent combinations of embodiments described herein. Further, though various embodiments described herein are discussed with reference to wave engines including cylindrical bodies, and/or portions of such bodies, the various embodiments, with or without modification, may be applicable to other free-floating watercraft, devices, or apparatuses. Such free-floating watercraft, devices, or apparatuses may vary in shape, size, and functionality, and may include, without limitation, ships associated with one or more wave engines, tanker ships or other transports, deployment ships, buoys, data centers, etc.

Figure 2:
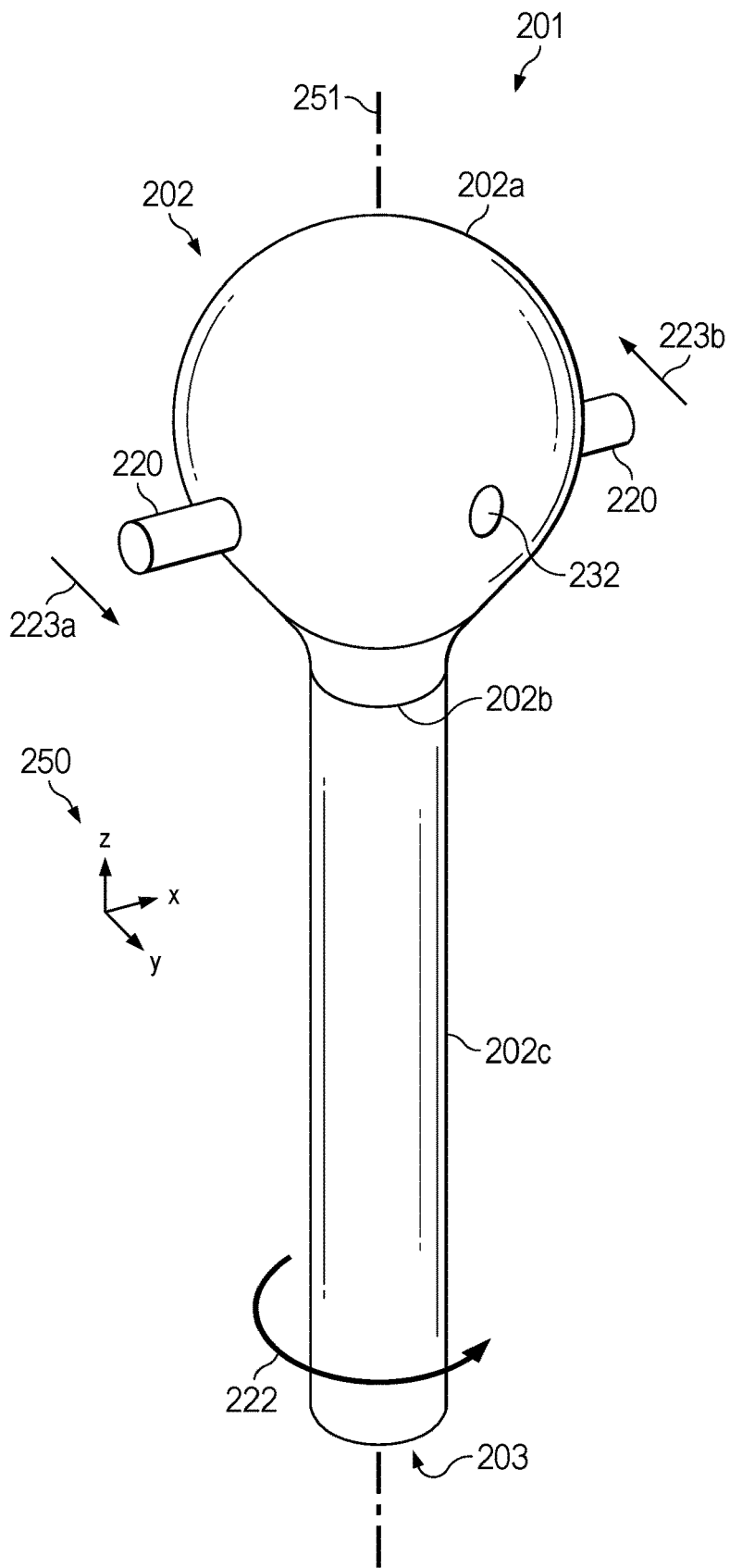
FIG. 2 shows a simplified perspective view of a wave engine in accordance with an embodiment of the present disclosure.

Referring now to FIG. 1, a schematic diagram of a wave energy harvesting system 100 is shown. The wave energy harvesting system 100 may include a free-floating body 101. In an example embodiment, the free-floating body 101 may be configured as a wave engine 101. FIG. 2, for example, details one embodiment of such a wave engine which may be included in the wave energy harvesting system 100. In some embodiments, the wave engine 101 may include one or more assemblies 120a, 120b operable to perform station-keeping (e.g., within a geographic area 124) and/or adjust translational position on a surface 105 of a body of water 104 on which the free-floating body 101 floats and moves (e.g., translates and/or rotates). In an example embodiment, the one or more assemblies 120a, 120b may be configured to induce rotation of the wave engine 101 so as to adjust horizontal (e.g., along the surface 105) translational motion thereof via a lift force resulting from a Magnus effect generated by the induced rotation. Exemplary methods for operating and rotating such a wave engine are discussed in detail below with reference to FIGS. 19 and 20.

The one or more assemblies 120a, 120b may take any one or a combination of the various configurations described herein. In some embodiments, for instance, the one or more assemblies 120a, 120b may be configured as one or more extensions 120a, 120b outwardly protruding from an external or exterior housing 102 of the free-floating body 101. As one example, FIGS. 3-10B present operational details of extensions of a free-floating body configured with ports fluidly coupled to three-way valves to rotate the free-floating body by releasing pressurized water from within the free-floating body. As an additional or alternative example, FIGS. 11-14B illustrate inboard turbines provided to capture energy from water flowing through angled ports of extensions of a free-floating body. As another example, FIGS. 15-18 depict extensions of a free-floating body as outboard propellers configured to rotate the free-floating body by propelling water external to the free-floating body. In additional or alternative embodiments, the one or more assemblies 120a, 120b may be configured as one or more recesses 120a, 120b inwardly extending into the external housing 102.

A set of Cartesian coordinate axes 150 is shown in FIG. 1, as well as in FIGS. 21A-21D (described in greater detail below), for contextualizing positions of the various components of the wave energy harvesting system 100 and for comparing between the view of FIG. 1 and the various views of FIGS. 21A-21D. Specifically, x-, y-, and z-axes are provided which are mutually perpendicular and/or orthogonal to one another, where: (i) the x- and z-axes define a plane of the diagrams shown in FIGS. 1, 21A, and 21C and the y-axis is perpendicular thereto; and (ii) the x- and y-axes define a plane of the diagrams shown in FIGS. 21B and 21D and the z-axis is perpendicular thereto. In some embodiments, a direction of gravity may be parallel to and coincident with a negative direction of the z-axis. In some embodiments, the surface 105 of the body of water 104 may include (e.g., be coincident with), at rest, the x- and y-axes and/or may be parallel to the x- and y-axes.

Though exemplified herein in the context of wave engines, the free-floating body 101 may be configured as any free-floating body capable of self-propulsion, e.g., by inducing a flow of pressurized water and/or harnessing one or more ambient environmental forces, and/or propulsion driven by energy extracted from stored fuel so as to translate along the surface 105 of the body of water 104. For example, the free-floating body 101 may be a ship 101, such as a deployment ship or a tanker ship or other transport, a buoy 101, an offshore platform 101, such as a data center, etc.

In some embodiments, the external housing 102 of the free-floating body 101 may be formed from a sufficiently durable material so as to withstand extremes of one or more ambient environmental conditions, such as winds, water waves, ambient temperature, etc. For example, the external housing 102 may be formed from steel, aluminum, and/or other metals or alloys thereof, and/or cement, fiberglass, carbon fiber, and/or plastic.

In some embodiments, the external housing 102 may be configured as a rotationally symmetric body. Specifically, the external housing 102 may exhibit a rotational and/or axial symmetry defined with respect to a central rotational axis 151 (e.g., a vertical, or nominally vertical, axis parallel with the z-axis and/or nominally orthogonal to the surface 105 of the body of water 104 at rest). The rotationally symmetric body may be configured with any one of a variety of three-dimensional shapes, such as spherical, ellipsoidal, cylindrical, and/or polygonal shapes. For example, the rotationally symmetric body may be cylindrical or quasi-cylindrical in shape [such shapes may generate larger lift coefficients from the Magnus effect relative to certain other shapes, such as spherical configurations (e.g., lift coefficients of about 15 as compared to lift coefficients of about 0.5, respectively)]. As used herein, "quasi-cylindrical" may refer to an otherwise cylindrical shape which is modified in one or more dimensions. For example, the rotationally symmetric body may be configured in a substantially cylindrical shape at a first end and a substantially spherical shape at an opposing second end (e.g., the opposing second end opposing the first end with respect to the z-axis). As such, the external housing 102 may be configured for substantially unencumbered translational and/or rotational motion in the body of water 104.

In embodiments where the free-floating body 101 is configured as the wave engine 101, water may pass into and through the wave engine 101 with upward and downward (e.g., heave) motion 106 (e.g., in a positive direction of the z-axis and the negative direction of the z-axis, respectively) of water waves. As described in greater detail below with reference to FIG. 2, the upward and downward motion 106 may induce water to pass into and through the wave engine 101, from which energy may be captured and converted to an energy product 108 (as indicated by a dashed arrow 126a). The energy product 108, for example, may include one or more of an electrolysis product or other fuel, such as $H_2$ gas, HCl, etc., removed carbon, minerals, or an executed computational algorithm, such as a proof-of-work mechanism for a cryptocurrency.

In some embodiments, the free-floating body 101 may include a controller or other computing device 110, which may include non-transitory memory on which executable instructions may be stored. The executable instructions may be executed by one or more processors of the controller 110 to perform various functionalities of the free-floating body 101. Accordingly, the executable instructions may include various routines for operation, propulsion, maintenance, tracking, and testing of the free-floating body 101. The controller 110 may be communicably coupled to various components (e.g., valves, power supplies, etc.) of the free-floating body 101 to command actuation and use thereof (wired and/or wireless communication paths between the controller 110 and the various components are omitted from FIG. 1 for clarity).

In certain embodiments, the controller 110 may be communicably coupled to a remote controller or computing device 114 via a wireless network 112. The remote controller 114 may be configured in a substantially similar manner to controller 110 with, in some examples, one or more modifications for a given use case (when the term "substantially" is used herein, it is meant that the recited relationship, characteristic, parameter, or value need not be realized with exact precision, but that deviations or variations known to those of skill in the art may occur to an extent that does not preclude the effect the relationship, characteristic, parameter, or value was intended to provide). For example, the remote controller 114 may be positioned so as to be accessible to an operator of the wave energy harvesting system 100, e.g., on a ship or in a physical structure 116 on land 118 (as illustrated in FIG. 1). As such, even when the free-floating body 101 is not geographically located within a national or subnational jurisdiction, the free-floating body 101 may nevertheless be in continuous (e.g., substantially uninterrupted) or periodic communication with the remote controller 114 which may be geographically located within a national or subnational jurisdiction (e.g., on the land 118).

In some embodiments, because the remote controller 114 may be configured for use by the operator, the remote controller 114 may include a user interface at which the operator may enter commands or otherwise modify operation of the wave energy harvesting system 100. The user interface may include various components for facilitating operator use of the wave energy harvesting system 100 and for receiving operator inputs (e.g., requests to adjust translational motion of the free-floating body 101), such as one or more displays, input devices (e.g., keyboards, touchscreens, computer mice, depressible buttons, mechanical switches, other mechanical actuators, etc.), lights, etc. In additional or alternative embodiments, the controller 110 may be configured with the user interface as described hereinabove.

In some embodiments, the remote controller 114 may be configured to operate autonomously or semi-autonomously to modify, control, adjust, and/or alter operation of the wave energy harvesting system 100 and/or components thereof, including, but not limited to, adjusting, configuring, specifying, programming, and/or controlling translational motion of the free-floating body 101.

In an example embodiment, the one or more assemblies 120a, 120b may include one or more first assemblies 120a and/or one or more second assemblies 120b. In some embodiments, the one or more first assemblies 120a may outwardly protrude from one or more side surfaces of the external housing 102 (e.g., extending substantially perpendicular to the z-axis). In additional or alternative embodiments, and as shown in FIG. 1, the one or more first assemblies 120a may be submersed within the body of water 104 when the free-floating body 101 is floating on, and/or at, the surface 105 of the body of water 104. As such, the one or more first assemblies 120a may assist with propulsion of the free-floating body 101 by generating one or more localized currents within the body of water 104, e.g., resulting in creation of a torque or moment inducing rotation of the free-floating body 101. In other embodiments, the one or more first assemblies 120a may be exposed to air and winds above the surface 105 of the body of water 104 when the free-floating body 101 is floating on, and/or at, the surface 105. In one example, at least one of the one or more first assemblies 120a may include one or more ports (not shown at FIG. 1) configured to expel pressurized water from within the free-floating body 101 into or above the body of water 104 (depending on whether or not the one or more first assemblies 120a is submersed within the body of water 104). The pressurized water may be pressurized by a combination of wave motion, a specific arrangement of internal components of the free-floating body 101, and/or a gas pressure exerted by a stored gas. In an additional or alternative example, at least one of the one or more first assemblies 120a may include one or more inboard turbines or propellors [e.g., one or more turbines or propellors enclosed or otherwise housed within the external housing 102 (as used herein, a first component may be "enclosed" within a second component when the first component is contained and housed within physical bounds of a second component without any portion of the first component protruding outwardly from the second component, with the first component optionally in fluidic communication with an environment external to the second component)] configured to propel a flow of water from within the free-floating body 101 and through at least one of the one or more ports. In an additional or alternative example, the one or more first assemblies 120a may include one or more outboard propellors (e.g., one or more propellors positioned external to the external housing 102) configured to propel a flow of water within the body of water 104. In an additional or alternative example, the one or more first assemblies 120a may be configured as one or more adjustable rudders or flaps.

In some embodiments, the one or more second assemblies 120b may outwardly protrude from a top surface of the external housing 102 (e.g., extending substantially parallel to the z-axis). In additional or alternative embodiments, and as shown in FIG. 1, the one or more second assemblies 120b may be exposed to air and winds above the surface 105 of the body of water 104 when the free-floating body 101 is floating on, and/or at, the surface 105. As such, the one or more second assemblies 120b may assist with propulsion of the free-floating body 101 by harnessing an external force, e.g., from the wind (as indicated by arrows 107). In one example, the one or more second assemblies 120b may be configured as a static (e.g., rigidly affixed) wind turbine configured to harness external force from the wind, the static wind turbine including one or more vanes rigidly affixed to a portion of the external housing 102 extending above the surface 105 of the body of water 104 (e.g., the top surface of the external housing 102).

In some embodiments, the one or more assemblies 120a, 120b may be configured to rotate 122 the free-floating body 101 about the central rotational axis 151. As one example, the one or more first assemblies 120a may rotate 122 the free-floating body 101 by generating one or more flows of water substantially perpendicular to the central rotational axis 151 and/or substantially tangential to a cylindrical, or a quasi-cylindrical, surface radially symmetric about the central rotational axis 151. For instance, a first flow of water may be generated in a first direction aligned with a positive direction of the y-axis by one first assembly 120a and a second flow of water may be generated in a second direction parallel to first direction and aligned with a negative direction of the y-axis by another first assembly 120a (e.g., positioned opposite to the first assembly 120a generating the first flow of water). As an additional or alternative example, the one or more second assemblies 120b may induce the rotation 122 by redirecting the wind and/or reacting responsive to the wind. In certain embodiments, while the one or more second assemblies 120b may be statically positioned such that the rotation 122 may only occur in one direction (e.g., clockwise or counterclockwise), the one or more first assemblies 120a may dynamically alter the one or more flows of water to substitute or supplement the one or more second assemblies 120b and rotate 122 the free-floating body 101 in either a clockwise direction or a counterclockwise direction. In at least one embodiment, the one or more first assemblies 120a may be altogether omitted from the free-floating body 101 and the one or more second assemblies 120b may be relied upon to rotate 122 the free-floating body 101. In at least one embodiment, the one or more second assemblies 120b may be altogether omitted from the free-floating body 101 and the one or more first assemblies 120a may be relied upon to rotate 122 the free-floating body 101.

As described in greater detail below with reference to FIGS. 21A-21D, rotation 122 of the free-floating body 101 within the body of water 104 relative to one or more ambient environmental forces (e.g., winds and/or water waves) may generate a Magnus effect which results in a lift force that adjusts translational motion of the free-floating body 101 along the surface 105 of the body of water 104. Specifically, and analogous to a lift force generated by a wing during takeoff of an aircraft, the lift force may be generated by a pressure differential (e.g., asymmetries in a pressure distribution within the body of water 104 locally surrounding the free-floating body 101) produced around the free-floating body 101 by the rotation 122.

In some embodiments, the adjustment to the translational motion of the free-floating body 101 may include an adjustment to a direction of the translational motion. In some embodiments, a magnitude of the translational motion may be adjusted in addition to the direction of the translational motion or, in other embodiments, the magnitude of the translational motion may be adjusted alone. In certain embodiments, the free-floating body 101 may include at least one translational propellor (e.g., at least one of the one or more first assemblies 120a) positioned external to the external housing 102 which may additionally or alternatively adjust the translational motion without rotating 122 the free-floating body 101.

In certain embodiments, such as when the translational propellor is used in isolation for translational motion, a significant proportion (e.g., a majority) of energy captured by the free-floating body 101 may be utilized to power propulsion of the free-floating body 101. In other embodiments, when rotation 122 of the free-floating body 101 is induced to generate a Magnus effect, a same magnitude of the translational motion may be realized with a smaller proportion of energy devoted to propulsion relative to when the translational propellor is used in isolation (thus resulting in greater net captured energy). As such, the Magnus effect may be relied upon, under certain conditions, to adjust translational motion of the free-floating body 101 with relatively little energy apportioned to propulsion as compared to certain other configurations in which rotation of the free-floating body 101 is not enabled.

Referring now to FIGS. 21A-21D, simplified force diagrams of the free-floating body 101 are variously depicted. Specifically, FIGS. 21A and 21B respectively depict simplified force diagrams of the free-floating body 101 from side and top views thereof when the free-floating body 101 is not being rotated with respect to the central rotational axis 151 and FIGS. 21C and 21D respectively depict simplified force diagrams of the free-floating body 101 from side and top views thereof when the free-floating body 101 is being rotated 122 with respect to the central rotational axis 151. Hereinbelow, description of FIGS. 21A-21D is concatenated and each of FIGS. 21A-21D may be referred to interchangeably where relevant. For example, reference may be made to one or more specific figures when one or more of FIGS. 21A-21D illustrate a given component or aspect of the free-floating body 101 with at least some particularity.

Figure 21B:
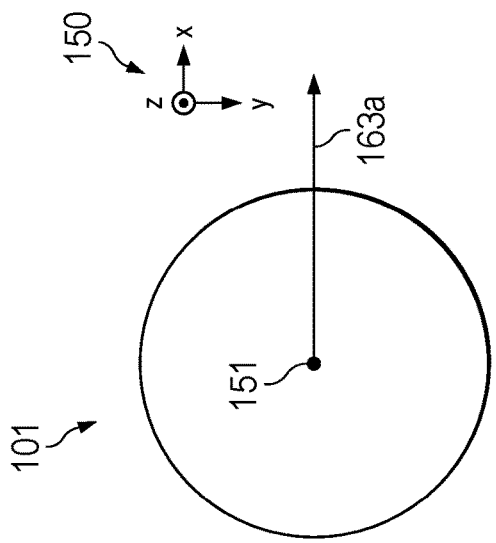
FIG. 21B shows a simplified force diagram of the free-floating body of FIG. 1 from a top view thereof when the free-floating body is not being rotated.
Figure 21A:
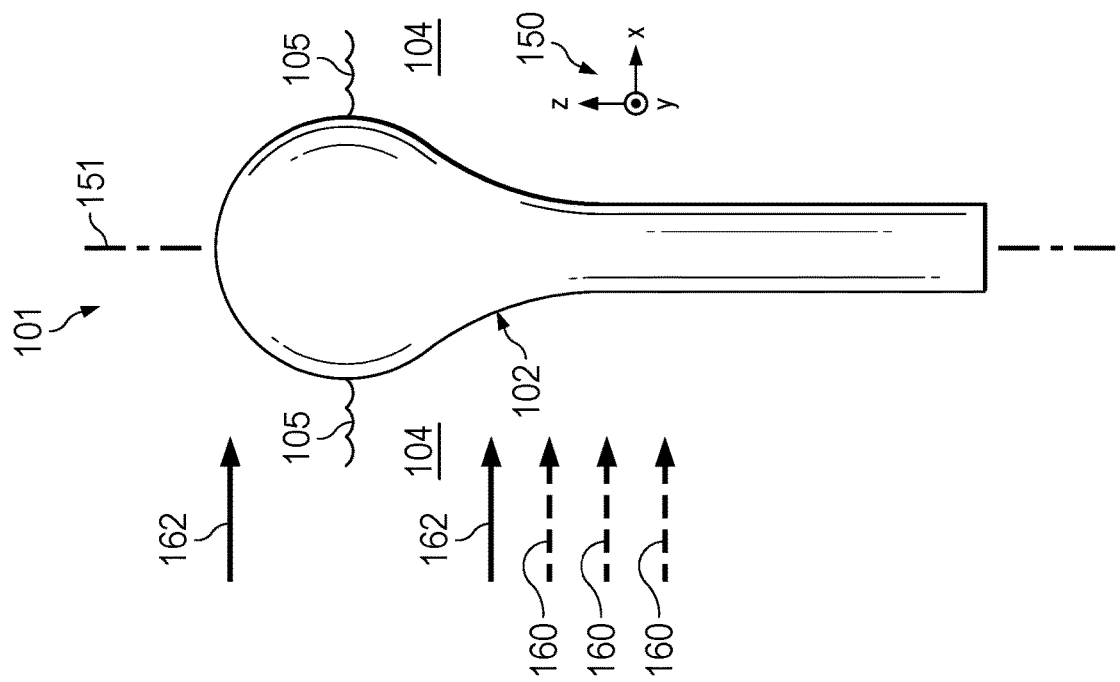
FIG. 21A shows a simplified force diagram of the free-floating body of FIG. 1 from a side view thereof when the free-floating body is not being rotated.
Figure 21D:
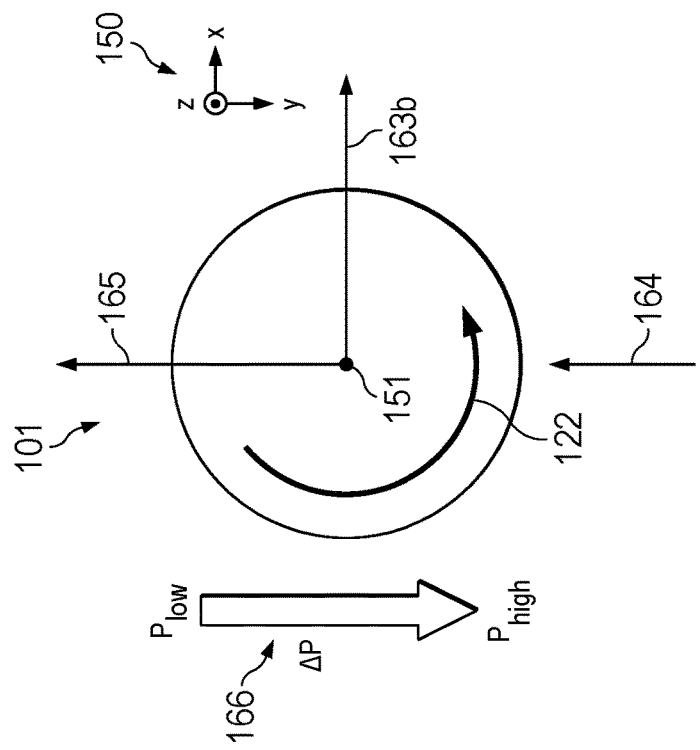
FIG. 21D shows a simplified force diagram of the free-floating body of FIG. 1 from a top view thereof when the free-floating body is being rotated.
Figure 21C:
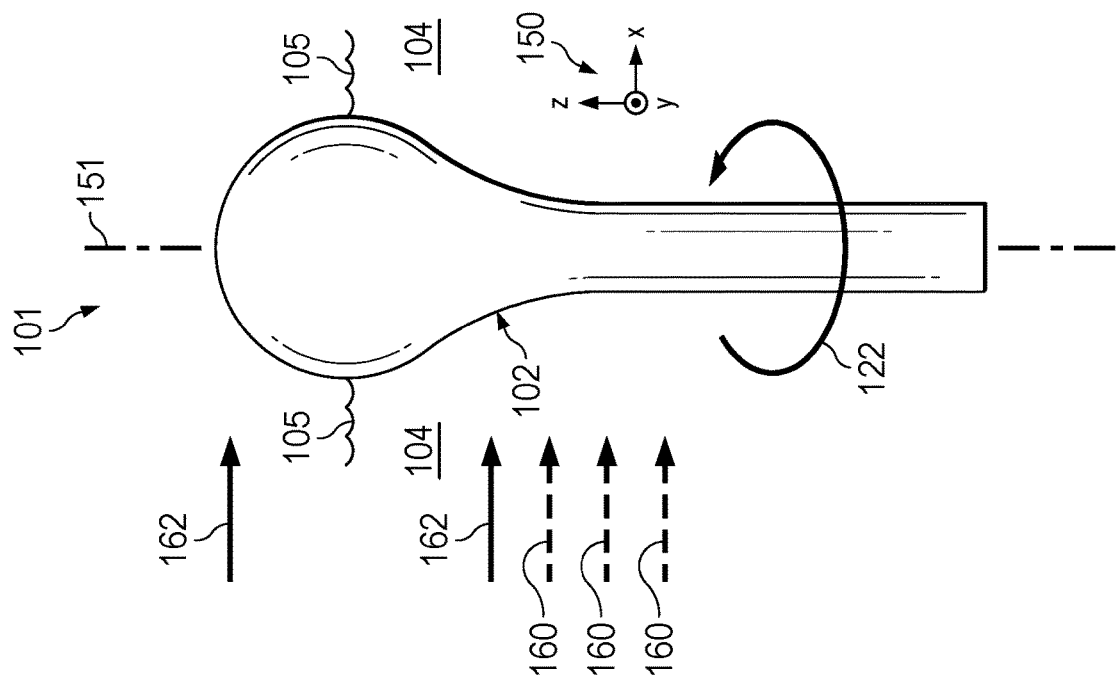
FIG. 21C shows a simplified force diagram of the free-floating body of FIG. 1 from a side view thereof when the free-floating body is being rotated.

In some embodiments, and as shown in FIGS. 21A and 21C, the free-floating body 101 may be subject to various ambient forces. As an example, a first ambient force 160 may be exerted on the free-floating body 101 by a current of the body of water 104. In such an example, the first ambient force 160 may be an aggregate sum of applied forces including one or more of friction-driven surface currents (e.g., Ekman transport), geostrophic currents (e.g., currents balanced by a Coriolis force), or currents from thermohaline circulation. The first ambient force 160 may be applied with a substantially constant magnitude along a length of the free-floating body 101 submersed below the surface 105 of the body of water 104 (e.g., along the z-axis), although in certain cases variations in a direction of the current may exist due to corresponding changes in Ekman transport.

As another example, a second ambient force 162 may be exerted on the free-floating body 101 by the wind and wind-induced waves in the body of water 104. In such an example, the second ambient force 162 may be an aggregate sum of a wind force $F_{wind}$ directly exerted by the wind and a wave force $F_{wave}$ indirectly exerted by the wind, e.g., via the wind-induced waves. $F_{wind}$ and $F_{wave}$ may have a same direction or similar directions in a place defined by the x- and y-axes (e.g., parallel to the surface 105 of the body of water 104). $F_{wind}$ may be exclusively applied along a length of the free-floating body 101 exposed above the surface 105 of the body of water 104 and $F_{wave}$ may be exclusively applied along the length of the free-floating body submersed below the surface 105 of the body of water 104. $F_{wind}$ may be determined as a product of a coefficient of wind drag, an ambient air pressure, a squared velocity of the wind, and an area against which $F_{wind}$ is being exerted (e.g., a portion of the free-floating body 101 exposed to and facing the wind). $F_{wave}$ may be inconstantly applied along a differential of a velocity of the waves, e.g., a differential which exponentially decays from an uppermost submersed portion of the free-floating body 101 (e.g., along the z-axis) to a lowermost submersed portion of the free-floating body 101 (e.g., along the z-axis). An overall velocity of the free-floating body 101 due to the waves may result from the aggregate effects of wave motion and Stokes drift.

As a result of cumulative effects of the first and second ambient forces 160 and 162, and as shown in FIG. 21B, a velocity of the free-floating body 101 (e.g., a rate at which the free-floating body 101 is translating along the surface 105 of the body of water 104) may be generated in a direction 163a. The velocity of the free-floating body 101 may include at least a first component resulting from the first ambient force 160 and a second component resulting from the second ambient force 162.

When rotation 122 is induced about the central rotational axis 151, and as further shown in FIG. 21D, a Magnus effect is additionally generated which may contribute a third component to the velocity of the translation of the free-floating body 101 in a direction 165 along the surface 105 of the body of water 104. As further shown, the direction 165 may be perpendicular to a direction 163b of a velocity of the free-floating body 101 (e.g., as adjusted by the wind and the waves) relative to a velocity which would result from the first ambient force 160 alone (e.g., from the current of the body of water 104 alone).

The generated Magnus effect may result in the third component of the velocity via a lift force 164 which depends on at least two factors: (i) generation of a pressure differential 166 (depicted in FIG. 21D as a change in pressure ΔP from a lower pressure $P_{low}$ to a higher pressure $P_{high}$) via the rotation 122 of the free-floating body 101 about the central rotational axis 151; and (ii) a component of a velocity of the free-floating body 101 relative to the body of water 104. More specifically, the lift force 164 may be represented as:

$$F_{lift} = 0.5 \times C_L \times \rho \times U^2 \times D \times L \tag{1}$$

wherein $F_{lift}$ is the lift force 164, $\rho$ is a density of a surrounding fluid (e.g., of the body of water 104), U is the velocity of the free-floating body 101 relative to the velocity which would result from the first ambient force 160 alone, D is a diameter of the free-floating body 101 (e.g., a diameter of an approximate cylindrical volume of a submersed portion of the free-floating body 101), L is a length of the free-floating body 101 (e.g., a length of an approximate cylindrical volume of the free-floating body 101), and $C_L$ is a lift coefficient which is adjustable by adjusting a velocity of the rotation 122 and/or a direction the rotation 122. The lift coefficient $C_L$ may range from 1 to 25 as dependent on a nonlinear relationship of the Reynolds number for the surrounding fluid (e.g., the body of water 104) and a ratio of the velocity of the rotation 122 to a velocity of the surrounding fluid.

In some embodiments, a feedback loop between the various components of the velocity of the free-floating body 101 may result from adjustments to translational motion of the free-floating body 101 caused by the Magnus effect, which may in turn alter the velocity of the free-floating body 101 upon which in part a magnitude of the Magnus effect and a direction of the Magnus effect depend (and so on, at least assuming there the rotation 122 and the second ambient force 162 continue uninterrupted). The various forces involved may be dynamically accounted for via sensor data, meteorological data, previous and current trajectories, etc., allowing translation of the free-floating body 101 along the surface 105 of the body of water 104 to be controlled.

Returning now to FIG. 1, in some embodiments, the one or more assemblies 120a, 120b may include one or more continuously adjustable parameters such that the direction and/or the magnitude of the translational motion may be dynamically adjusted and/or maintained. In some embodiments, dynamically adjusting the one or more continuously adjustable parameters may concomitantly adjust a speed at which the free-floating body 101 is rotated 122 and/or a direction (e.g., clockwise or counterclockwise) in which the free-floating body 101 is rotated 122, e.g., so as to adjust a lift coefficient and/or a direction of the lift force generated via the Magnus effect. In one example, a change in one or more ambient environmental parameters affecting the translational motion of the free-floating body 101 may be detected and accounted for by dynamically adjusting the one or more continuously adjustable parameters of the one or more assemblies 120a, 120b. In an additional or alternative example, the one or more continuously adjustable parameters may be adjusted responsive to receiving, e.g., from the remote controller 114, an indication to adjust the translational motion (e.g., the direction and/or the magnitude of the translational motion) of the free-floating body 101. In some embodiments, the one or more continuously adjustable parameters may include port angles, valve openings, and/or propellor speeds. In some embodiments, dynamic adjustments to the one or more continuously adjustable parameters may be executed on a periodic basis, such as every 12 hours.

In some embodiments, the translational motion of the free-floating body 101 may be adjusted by changes to a rate and/or a direction of the rotation of the free-floating body 101 (and thus a direction and a magnitude of lift due to the Magnus effect) so as to maintain the free-floating body 101 within a defined geographic area 124 of the body of water 104. In one example, the defined geographic area 124 may be selected so as to prevent collisions of the free-floating body 101 with the land 118 (e.g., a rock, an island, or a continent), other free-floating bodies 101, ships, buoys, offshore platforms, etc. Accordingly, the defined geographic area 124 may be selected to be an open and sufficiently deep expanse of water in a low trafficked area (e.g., away from shipping lanes). In some embodiments, the defined geographic area 124 may be a bounded geographic area, such as a polygonal or elliptical region. The bounded geographic area may be defined by a largest dimension, such as 500 miles, and/or a total area. In other embodiments, the defined geographic area 124 may be an annular geographic area encircling the Earth, e.g., within a defined distance of a given latitude.

In some embodiments, the adjustments to the translational motion may be executed based on a manual operator input, e.g., at the user interface of the remote controller 114. In additional or alternative embodiments, the adjustments to the translational motion may be automatically adjusted, e.g., to maintain the free-floating body 101 within the defined geographic area 124, based on feedback from one or more sensors and/or data received via the wireless network 112. As an example, the free-floating body 101 may include an accelerometer (e.g., an inertial measurement unit; not shown) configured to gather changes in local positional data, e.g., resulting from water wave motions. As an additional or alternative example, the free-floating body 101 may include a global positioning system (not shown) configured to gather geographic positional data. As an additional or alternative example, the free-floating body 101 may include a wind speed sensor (not shown) configured to measure wind speed. As an additional or alternative example, such data (e.g., the positional data and/or the wind speed) may be received via the wireless network 112, in addition to other data such as meteorological data (e.g., water wave height, direction of water wave propagation, water wave period, weather, etc.). In some embodiments, directions and magnitudes of applied forces may be inferred based on the feedback from the one or more sensors and/or the data received via the wireless network 112, such that specific operational parameters (e.g., the one or more continuously adjustable parameters) may be adjusted responsive such that changes in individual applied forces may be accounted for with specificity.

An overall energy flow 126 of the wave energy harvesting system 100 is schematically depicted in FIG. 1, in which energy captured at the free-floating body 101 from water induced therethrough by the upward and downward motion 106 of the water waves (as indicated by the dashed arrow 126*a*) may be converted to the energy product 108 and transferred to a ship 128 (as indicated by a dashed arrow 126*b*) and then transferred from the ship 128 to a land-based vehicle 130 (as indicated by a dashed arrow 126*c*) to be transported to a storage facility and/or an end user for consumption. For example, in some embodiments, the wave energy harvesting system 100 may include a plurality of nodes including a plurality of free-floating bodies 101, one or more ships 128 to transport a plurality of energy products 108 from the plurality of free-floating bodies 101 to the land 118, and one or more land-based vehicles 130 to transport the plurality of energy products 108 from the one or more ships 128 to the storage facility and/or the end user.

Referring now to FIG. 2, a simplified perspective view of a wave engine 201 is shown. In an example embodiment, and as shown in FIG. 2, the wave engine 201 may include an external or exterior housing 202 and a pair of extensions 220 outwardly protruding from the external housing 202, the pair of extensions 220 operable to rotate the wave engine 201 in a body of water. In some embodiments, the wave engine 201 may be positioned in a wave energy harvesting system, such as the wave energy harvesting system 100 described in detail above with reference to FIG. 1. As such, in one example, the wave engine 201 may replace the free-floating body 101 of the wave energy harvesting system 100 of FIG. 1. Moreover, in such an example, the wave engine 201 may be assembled and configured similarly to the free-floating body 101 of FIG. 1 and may operate in a substantially similar manner in practice. Accordingly, excepting minor configurational differences, the description of the free-floating body 101 provided above with reference to FIG. 1 may be additionally applied to the wave engine 201 depicted in FIG. 2 in some embodiments. In certain embodiments, additional components and/or functionalities may be included in the wave engine 201 which were not described in detail above with reference to FIG. 1 and which may additionally be applied to the free-floating body 101 depicted in FIG. 1.

To indicate suitability for substitution in certain non-limiting embodiments, similar reference indicators have been applied to elements which may be interchangeable with one another. For example, elements depicted in FIG. 2 may be labeled with the same numbers for the "tens" and "ones" positions as those elements in FIG. 1 which may be interchangeable in such examples, but may utilize a "2" in the "hundreds" position instead of a "1" (e.g., the external housing 202 of the wave engine 201 of FIG. 2 and the external housing 102 of the free-floating body 101 of FIG. 1 may be interchangeable in certain non-limiting embodiments). As such, in certain embodiments, description of any such interchangeable elements described hereinabove may substitute or supplement description provided below with reference to FIG. 2. Alphabetical indicators (e.g., "a" in "202*a*") may, in some examples, identify subcomponents included as a part of another component (e.g., "202*a*" may identify a subcomponent of "202"). In other examples, such alphabetical indicators may indicate a relationship between two elements which are nonequivalent in orientation but substantially alike otherwise (e.g., "223*a*" and "223*b*," as described hereinbelow).

A set of Cartesian coordinate axes 250 is shown in FIG. 2 for contextualizing positions of the various components of the wave engine 201. Specifically, x-, y-, and z-axes are provided which are mutually perpendicular and/or orthogonal to one another. In some embodiments, a direction of gravity may be parallel to and coincident with a negative direction of the z-axis.

In some embodiments, the wave engine 201 may freely float (e.g., float untethered to land, a seafloor, a lakebed, another floating body, etc.) on a surface of a body of water (not shown at FIG. 2). Specifically, buoyancy of the wave engine 201 may be assisted, at least in part, by gas captured and enclosed or otherwise housed within an upper hull enclosure or buoy 202*a* of the external housing 202. In an example embodiment, the upper hull enclosure 202*a* may be at least partially hollow [e.g., the upper hull enclosure 202*a* may include an internal reservoir enclosed or otherwise housed therein (not shown at FIG. 2)] so as to be filled with the captured gas. The captured gas may include, for example, air and/or another gas, such as hydrogen and/or nitrogen, supplied at a manufacturing location or a deployment location. Additionally or alternatively, the air and/or another gas may enter the upper hull enclosure 202*a* from a surrounding, ambient environment. Additionally or alternatively, the captured gas may be generated via a conversion process occurring within the wave engine 201, wherein the conversion process may convert energy captured by the wave engine 201 to an energy product (e.g., the conversion process may be an electrolysis reaction and the energy product may include an electrolysis product such as hydrogen gas).

In an example embodiment, the captured gas within the upper hull enclosure 202*a* may be compressed therein so as to exhibit a gas pressure greater than a pressure of the surrounding ambient environment (e.g., atmospheric pressure at the surface of the body of water on which the wave engine 201 floats). In some embodiments, the captured gas may be compressed, at least in part, by water that has entered the external housing 202 via a lower aperture 203. More specifically, the external housing 202 may include a lower inertial water tube or pipe 202*c* fluidly coupled to each of the lower aperture 203 and the upper hull enclosure 202*a* through which the water that has entered the external housing 202 may pass and enter into the upper hull enclosure 202*a*. In certain embodiments, the water that has entered the external housing 202 may be injected, propelled, or otherwise induced through the lower aperture 203 as a result of water wave motion, whereby entering water may rise and fall, e.g., proportionate with or otherwise responsive to the water wave motion.

In some embodiments, the external housing 202 may include an annular collar 202*b* which mechanically couples the lower inertial water tube 202*c* to the upper hull enclosure 202*a*. Specifically, the annular collar 202*b* may rigidly affix the lower inertial water tube 202*c* to the upper hull enclosure 202*a* so as to provide overall structural reinforcement of the external housing 202. As shown in FIG. 2, the annular collar 202*b* may be configured in a curvaceous and concave shape, e.g., an approximate frustoconical shape, so as to form a substantially continuous outer surface of the external housing 202 along with the upper hull enclosure 202*a* (e.g., which may be configured in an approximately spherical shape) and the lower inertial water tube 202*c* (e.g., which may be configured in an approximately cylindrical shape).

In some embodiments, the water that has entered the external housing 202 may be released into the surrounding ambient environment via one or more upper apertures 232 fluidly coupled to the internal reservoir enclosed within the upper hull enclosure 202*a* such that a pressure and/or a flow of the water through the external housing 202 may be maintained and/or adjusted and/or the wave engine 201 may be propelled by inducing a localized current within the body of water, e.g., along a negative direction of the y-axis. Specifically, the one or more upper apertures 232 may be respectively fluidly coupled to the internal reservoir via one or more passages (not shown at FIG. 2), each of the one or more passages housing a turbine configured to capture energy via water exiting the internal reservoir (e.g., the turbine may be configured to adjust a torque thereof dynamically responsive to a pressure of the exiting water). The one or more upper apertures 232 may be positioned on the upper hull enclosure 202a as shown in FIG. 2, or, in additional or alternative embodiments, the one or more upper apertures 232 may be positioned elsewhere on the external housing 202, such as on the annular collar 202b. Though one upper aperture 232 is visible in FIG. 2, in additional or alternative embodiments, a plurality of upper apertures 232 may be included, each of the plurality of upper apertures 232 fluidly coupled to the internal reservoir. In such embodiments, the plurality of upper apertures 232 may be positioned on the external housing 202 substantially adjacent to one another (e.g., on a same side of a plane including a central rotational axis 251) or substantially distant from one another (e.g., on opposite sides of a plane including the central rotational axis 251 and parallel to a plane defined by the y- and z-axes). In an example embodiment, a pair of upper apertures 232 may be positioned on opposite sides of the external housing 202 from one another (e.g., along the y-axis and on opposite sides of a plane parallel to a plane formed by the x- and z-axes).

In some embodiments, the pair of extensions 220 may be positioned on opposite sides of the external housing 202 (e.g., on opposite sides of the plane including the central rotational axis 251) and aligned within a same plane, e.g., within the plane parallel to the plane formed by the x- and z-axes. In some examples, the pair of extensions 220 may be positioned along a same axis (e.g., the x-axis). In other examples, the pair of extensions 220 may be offset from an axis (e.g., one of the pair of extensions 220 may be positioned above the x-axis on the upper hull enclosure 202a and the other of the pair of extensions 220 may be positioned below the x-axis on the upper hull enclosure 202a). Thus positioned, in certain embodiments, the pair of extensions 220 may be configured to rotate 222 the wave engine 201 about the central rotational axis 251. Specifically, the pair of extensions 220 may rotate 222 the wave engine 201 by respectively generating a pair of opposing localized currents within the body of water substantially perpendicular to the central rotational axis 251. For instance, a first current of the pair of localized currents may be generated in a first direction 223a aligned with a positive direction of the y-axis by one extension 220 and a second current of the pair of localized currents may be generated in a second direction 223b parallel to first direction and aligned with the negative direction of the y-axis by the other extension 220. In one example, within the body of water, the pair of localized currents may be induced by outboard propellors included in the pair of extensions 220 (see, e.g., FIGS. 15-18) and/or streams of water exiting from the pair of extensions 220 (see, e.g., FIGS. 3-14B).

Figure 3:
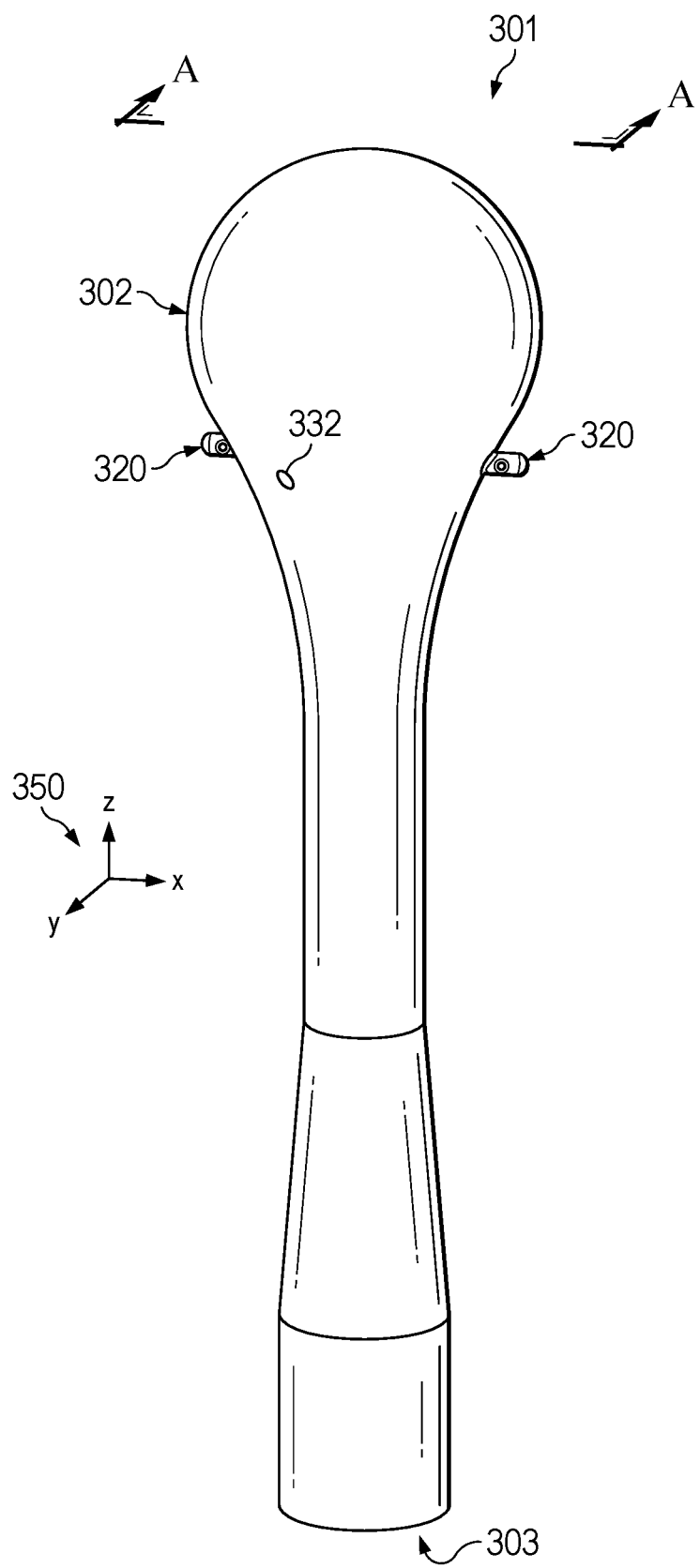
FIG. 3 shows a perspective view of a wave engine of the present disclosure.
Figure 4:
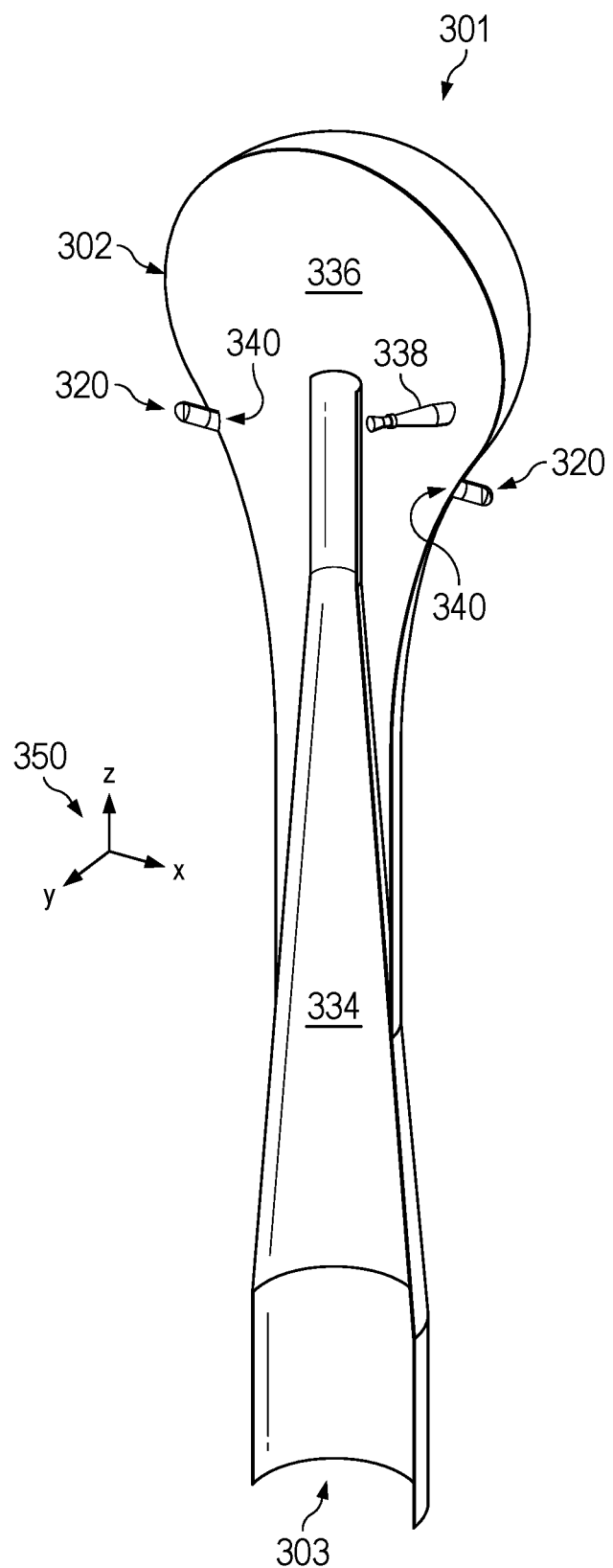
FIG. 4 shows a cross-sectional view of the wave engine of FIG. 3.
Figure 5:
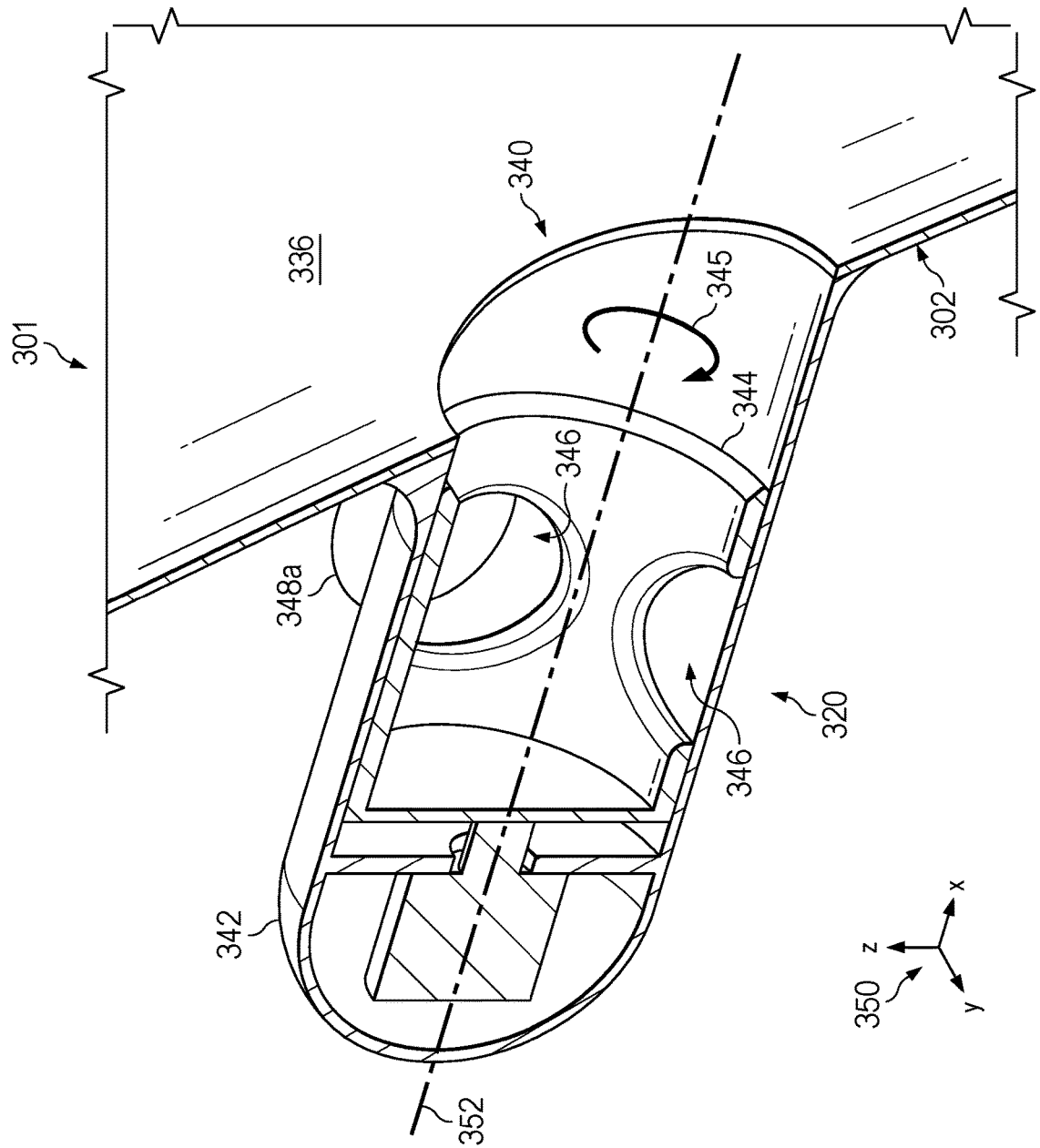
FIG. 5 shows a cross-sectional perspective view an extension of the wave engine of FIG. 3.
Figure 6:
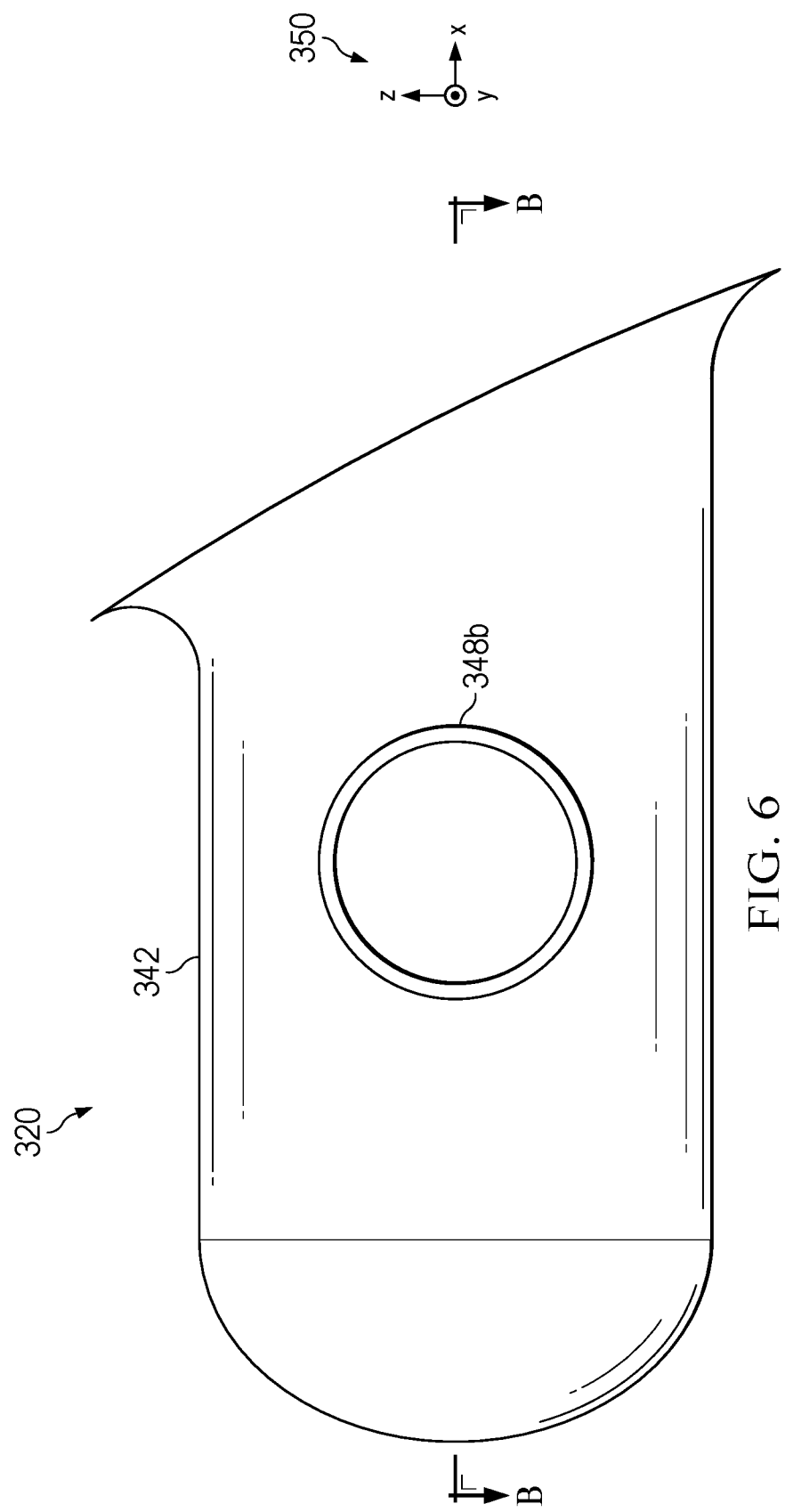
FIG. 6 shows a side view of the extension illustrated in FIG. 5.

Referring now to FIGS. 3-10B, various views of a wave engine 301 and individual components thereof are depicted. A perspective view of the wave engine 301 including an external or exterior housing 302 and a pair of extensions 320 outwardly protruding from the external housing 302, the pair of extensions 320 operable to rotate the wave engine 301 in a body of water (not shown at FIGS. 3-10B) by releasing pressurized water from within the wave engine 301, is shown in FIG. 3. A cross-sectional view of the wave engine 301 is shown in FIG. 4, the cross-sectional view being taken along a cutline A-A depicted in FIG. 3. One extension 320 of the pair of extensions 320 is shown in detail in FIGS. 5-8B. Specifically, a cross-sectional perspective view of the extension 320 is shown in FIG. 5, the cross-sectional perspective view being taken along the cutline A-A, and a side view of the extensions 320 is shown in FIG. 6. A cross-sectional view and a cross-sectional perspective view shown in FIGS. 7A and 7B, respectively, depict the extension 320 of FIGS. 5 and 6 in a first position, and a cross-sectional view and a cross-sectional perspective view shown in FIGS. 8A and 8B, respectively, depict the extension 320 of FIGS. 5 and 6 in a second position. The various cross-sectional views of FIGS. 7A-8B are taken along a cutline B-B depicted in FIG. 6. A bottom view and a simplified force diagram shown in FIGS. 9A and 9B, respectively, depict the wave engine 301 as configured to rotate in a first direction 322a about a central rotational axis 351, and a bottom view and a simplified force diagram shown in FIGS. 10A and 10B, respectively, depict the wave engine 301 as configured to rotate in a second direction 322b about the central rotational axis 351, where the rotation shown in FIGS. 9A-10B may be induced by operating the pair of extensions 320 to release the pressurized water from within the wave engine 301. Hereinbelow, description of FIGS. 3-10B is concatenated and each of FIGS. 3-10B may be referred to interchangeably where relevant. For example, reference may be made to one or more specific figures when one or more of FIGS. 3-10B illustrate a given component or aspect of the wave engine 301 with at least some particularity.

In some embodiments, the wave engine 301 may be positioned in a wave energy harvesting system, such as the wave energy harvesting system 100 described in detail above with reference to FIG. 1. As such, in one example, the wave engine 301 may replace the free-floating body 101 of the wave energy harvesting system 100 of FIG. 1. Moreover, in such an example, the wave engine 301 may be assembled and configured similarly to the free-floating body 101 of FIG. 1 and may operate in a substantially similar manner in practice. Additionally or alternatively, the wave engine 301 may be assembled and configured similarly to the wave engine 201 of FIG. 2 and may operate in a substantially similar manner in practice. Accordingly, excepting minor configurational differences, the description of the free-floating body 101 provided above with reference to FIG. 1 and/or the description of the wave engine 201 provided above with reference to FIG. 2 may be additionally applied to the wave engine 301 depicted in FIGS. 3-10B in some embodiments. In certain embodiments, additional components and/or functionalities may be included in the wave engine 301 which were not described in detail above with reference to FIGS. 1 and 2 and which may additionally be applied to the free-floating body 101 depicted in FIG. 1 or the wave engine 201 depicted in FIG. 2. Similarly, additional components and/or functionalities which are described in detail with reference to a subset of the embodiments depicted in FIGS. 3-10B may be additionally applied to remaining embodiments depicted in FIGS. 3-10B.

To indicate suitability for substitution in certain non-limiting embodiments, similar reference indicators have been applied to elements which may be interchangeable with one another. For example, elements depicted in FIGS. 3-10B may be labeled with the same numbers for the "tens" and "ones" positions as those elements in FIGS. 1 and 2 which may be interchangeable in such examples, but may utilize a "3" in the "hundreds" position instead of a "1" or a "2" (e.g., the external housing 302 of the wave engine 301 of FIGS. 3-10B and the external housing 102 of the free-floating body 101 of FIG. 1 may be interchangeable in certain non-limiting embodiments). As such, in certain embodiments, description of any such interchangeable elements described hereinabove may substitute or supplement description provided below with reference to FIGS. 3-10B. Alphabetical indicators may indicate a relationship between two elements which are nonequivalent in orientation but substantially alike otherwise (e.g., "349a" and "349b," as described hereinbelow).

A set of Cartesian coordinate axes 350 is shown in FIGS. 3-10B for contextualizing positions of the various components of the wave engine 301 and for comparing between the various views of FIGS. 3-10B. Specifically, x-, y-, and z-axes are provided which are mutually perpendicular and/or orthogonal to one another, where: (i) the x- and z-axes are parallel to a plane including the cutline A-A shown in FIG. 3 and the y-axis is perpendicular thereto; (ii) the x- and z-axes are parallel to a plane of the side view shown in FIG. 6 and the y-axis is perpendicular thereto; (iii) the x- and y-axes are parallel to a plane including the cutline B-B shown in FIG. 6 and the z-axis is perpendicular thereto; and (iv) the x- and y-axes are parallel to a plane of each of the cross-sectional views shown in FIGS. 7A and 8A, the bottom views shown in FIGS. 9A and 10A, and the simplified force diagram shown in FIGS. 9B and 10B and the z-axis is perpendicular thereto. In some embodiments, a direction of gravity may be parallel to and coincident with a negative direction of the z-axis.

In some embodiments, the wave engine 301 may be configured to permit water to pass therethrough, e.g., induced by water wave motion within the body of water, so as to power one or more turbines (not shown at FIGS. 3-10B) positioned within the external housing 302. In an example embodiment, water may enter the external housing 302 via a lower aperture 303 and ultimately exit the external housing 302 via a pair of upper apertures 332. As such, the lower aperture 303 may be fluidly coupled to the pair of upper apertures 332, e.g., via a series of fluidly coupled passages, reservoirs, and other chambers having the one or more turbines positioned therein. In an example embodiment, water may continuously pass (e.g., absent transient stoppages to a flow thereof) through the wave engine 301 during operation thereof.

For example, water entering the lower aperture 303 may subsequently pass through an internal passage 334 and into an internal reservoir 336, the internal passage 334 being fluidly coupled to each of the lower aperture 303 and the internal reservoir 336. As shown in FIG. 4, the internal reservoir 336 may be enclosed or otherwise housed within the external housing 302. In an example embodiment, the internal reservoir 336 may be configured to maintain buoyancy of the external housing 302 (and thereby the wave engine 301) relative to a surface of the body of water, e.g., by capturing and storing gas from an ambient environment, from an external gas supply, and/or as a product from an energy conversion process. In some embodiments, water within the internal reservoir 336 may be directed to a pair of turbine assemblies 338 fluidly coupled to the internal reservoir 336. In such embodiments, each of the pair of turbine assemblies 338 may include an exit passage fluidly coupled to a corresponding one of the pair of upper apertures 332 through which the water within the internal reservoir 336 may flow so as to power a turbine housed within the exit passage and then be released from within the external housing 302 via the corresponding one of the pair of upper apertures 332.

In additional or alternative embodiments, the water within the internal reservoir 336 may be directed to a pair of extension passages 340 included, at least in part, within the pair of extensions 320, respectively, each of the pair of extension passages 340 extending into the external housing 302 and fluidly coupled to the internal reservoir 336. In such embodiments, each given extension passage 340 of the pair of extension passages 340 may be fluidly coupled to a pair of extension ports 348a, 348b, through which water within the given extension passage 340 may selectively flow and thereby be released from within the external housing 302. Accordingly, in such embodiments, the internal reservoir 336 may be configured to direct water (e.g., the water within the external housing 302) through each given extension 320 of the pair of extensions 320 and to the pair of extension ports 348a, 348b included in the given extension 320.

One extension 320 of the pair of extensions 320 is described in detail below with reference to FIGS. 5-8B. Configurational and operational details of the other extension 320 not shown in FIGS. 5-8B may be the same as described for the extension 320 shown in FIGS. 5-8B, excepting changes resulting from a relative positioning and orientation of the other extension 320.

In some embodiments, the extension 320 may include an extension housing 342 which encloses other components of the extension 320. For example, the extension housing 342 may be at least partially hollow, permitting water to flow therethrough, e.g., through the extension passage 340, and providing a volume in which mechanical components, e.g., a three-way valve 344, may be positioned.

In some embodiments, the three-way valve 344 may be rotatably coupled to the extension housing 342 so as to selectively permit water to flow from the extension passage 340 and through to one of the pair of extension ports 348a, 348b. Specifically, the three-way valve 344 may rotate 345 about an extension rotational axis 352 so as to align one of a pair of apertures 346 with one of the pair of extension ports 348a, 348b and to align a stopper 347 with the other of the pair of extension ports 348a, 348b. In an example embodiment, the pair of extension ports 348a, 348b may be positioned on opposite sides of the extension 320 (e.g., on opposite sides of a plane including the extension rotational axis 352 and parallel to a plane defined by the x- and z-axes, such that each one of the pair of extension ports 348a, 348b may extend along the y-axis). Accordingly, in such an embodiment, the three-way valve 344 may be configured such that at least a portion of the stopper 347 is positioned opposite to the aligned one of the pair of apertures 346 permitting water through the one of the pair of extension ports 348a, 348b.

Figure 7A:
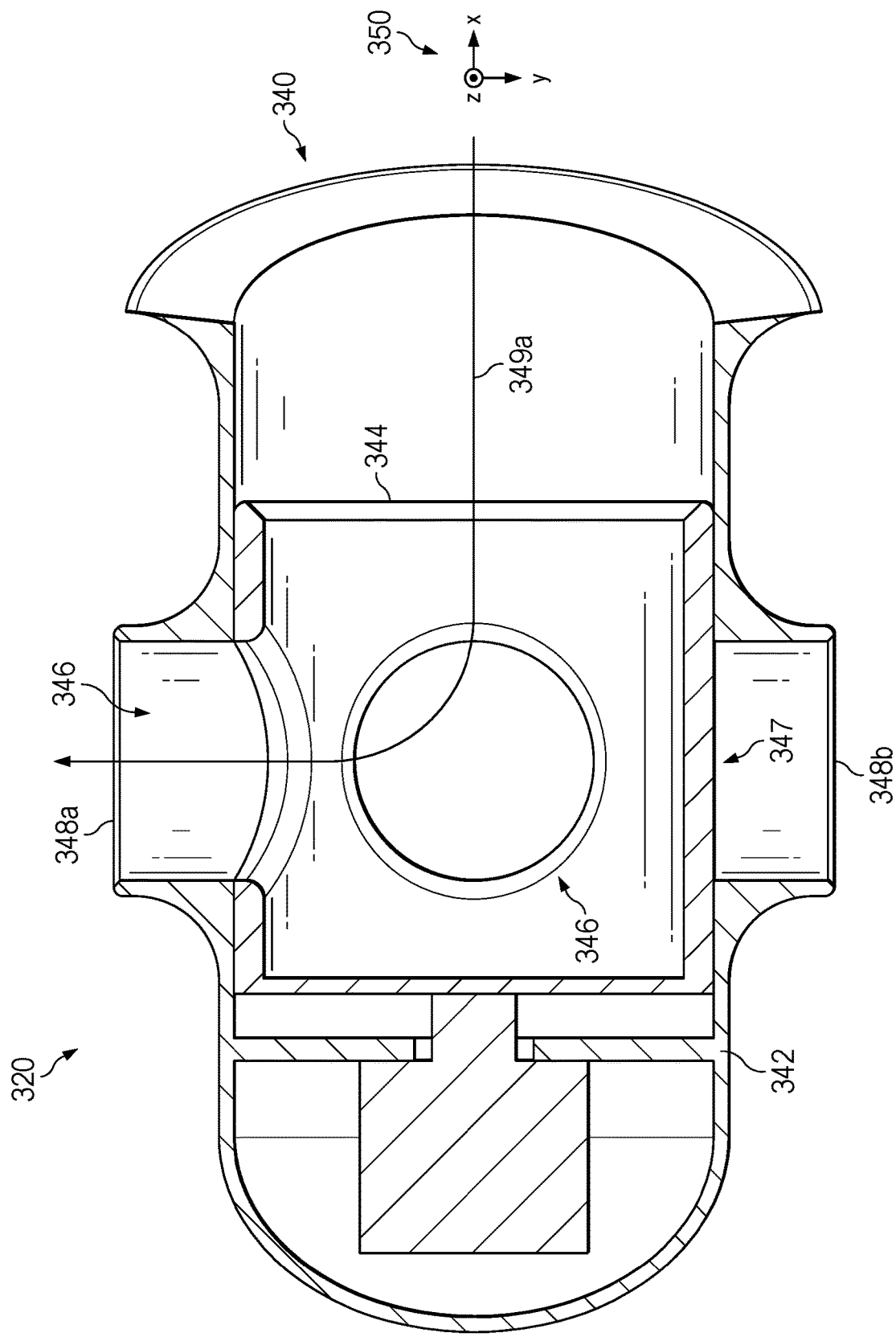
FIG. 7A shows a cross-sectional view of the extension of FIG. 5 configured in a first position.
Figure 7B:
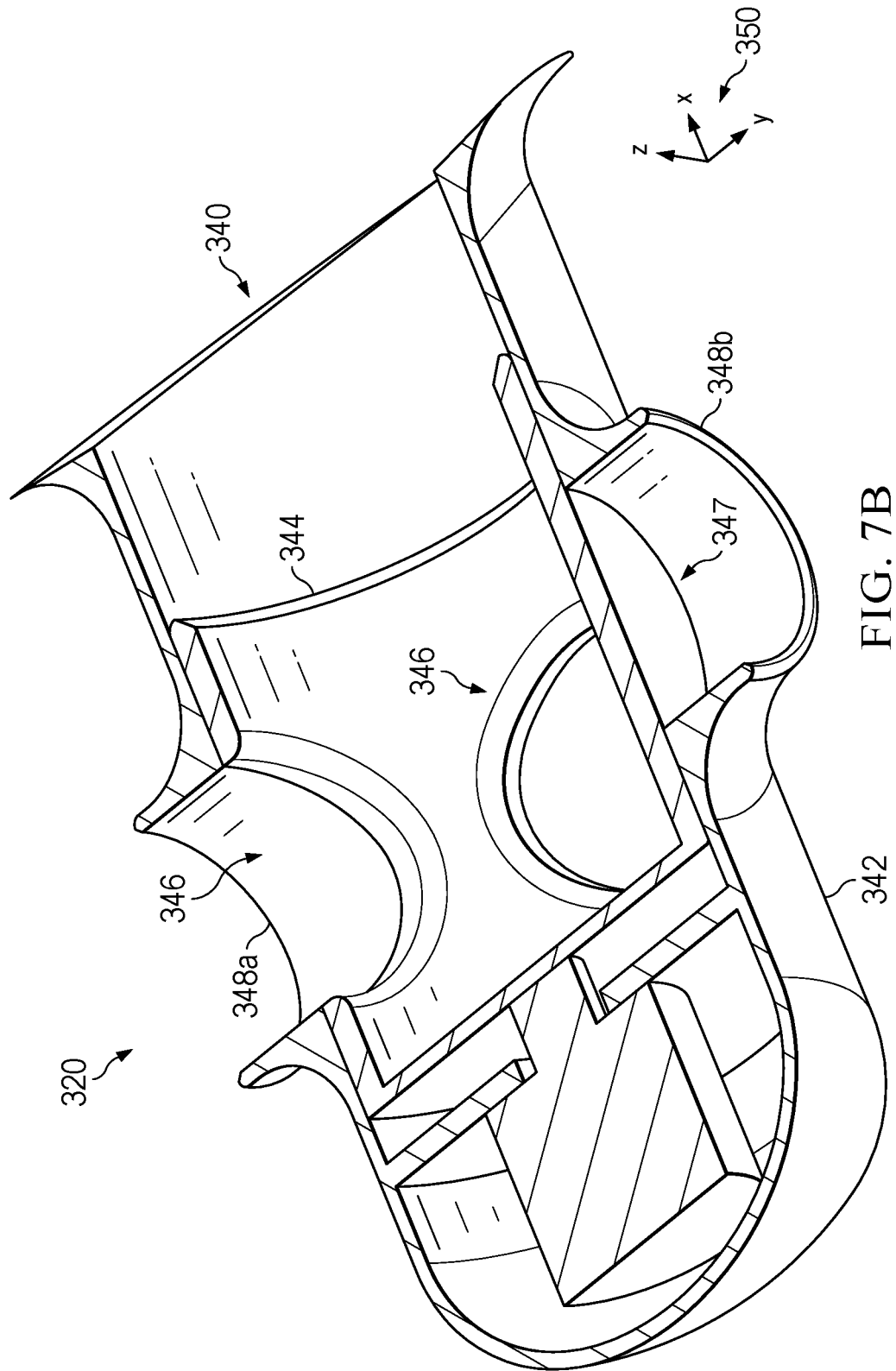
FIG. 7B shows a cross-sectional perspective view of the extension of FIG. 5 in the first position.
Figure 8A:
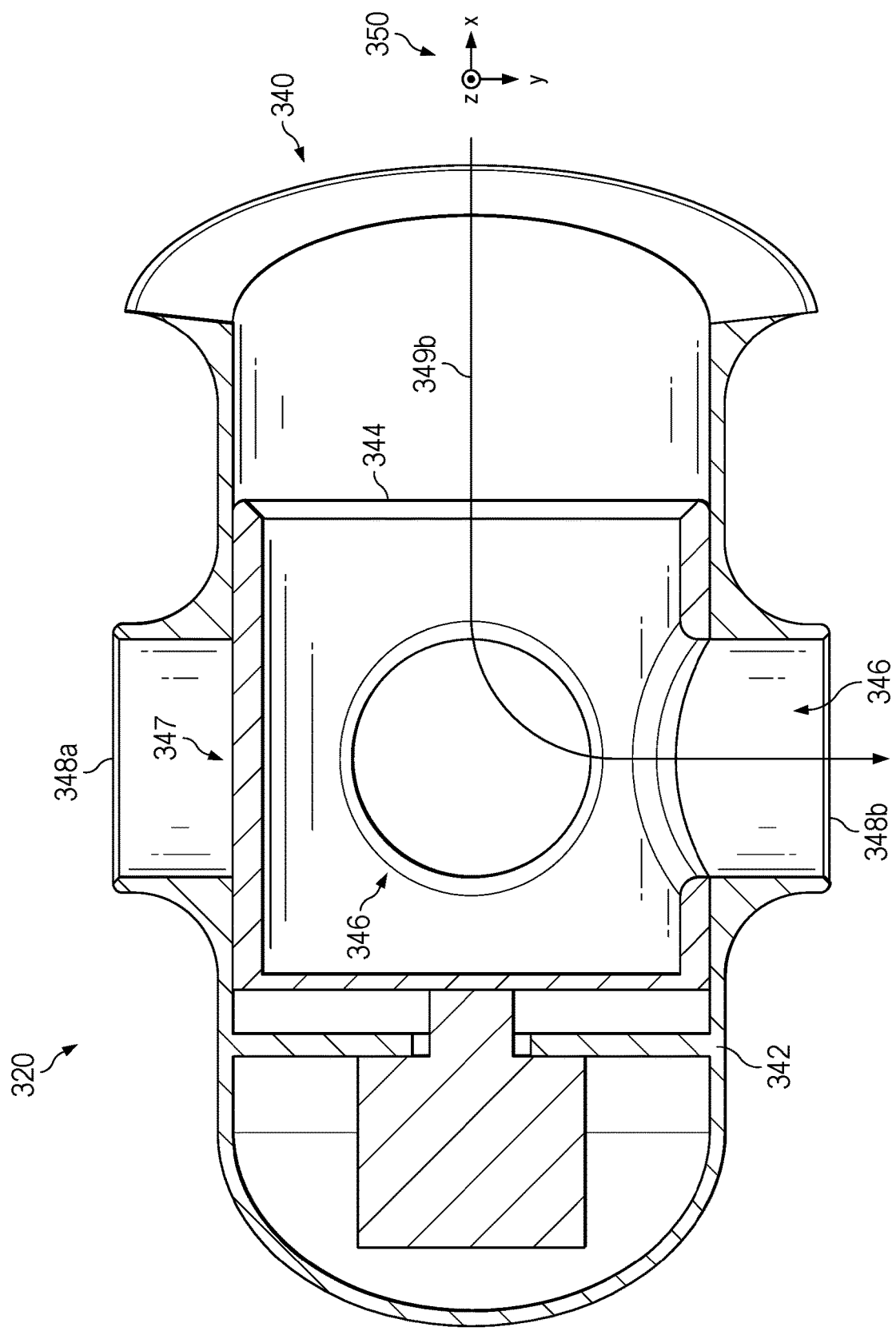
FIG. 8A shows a cross-sectional view of the extension of FIG. 5 configured in a second position.
Figure 8B:
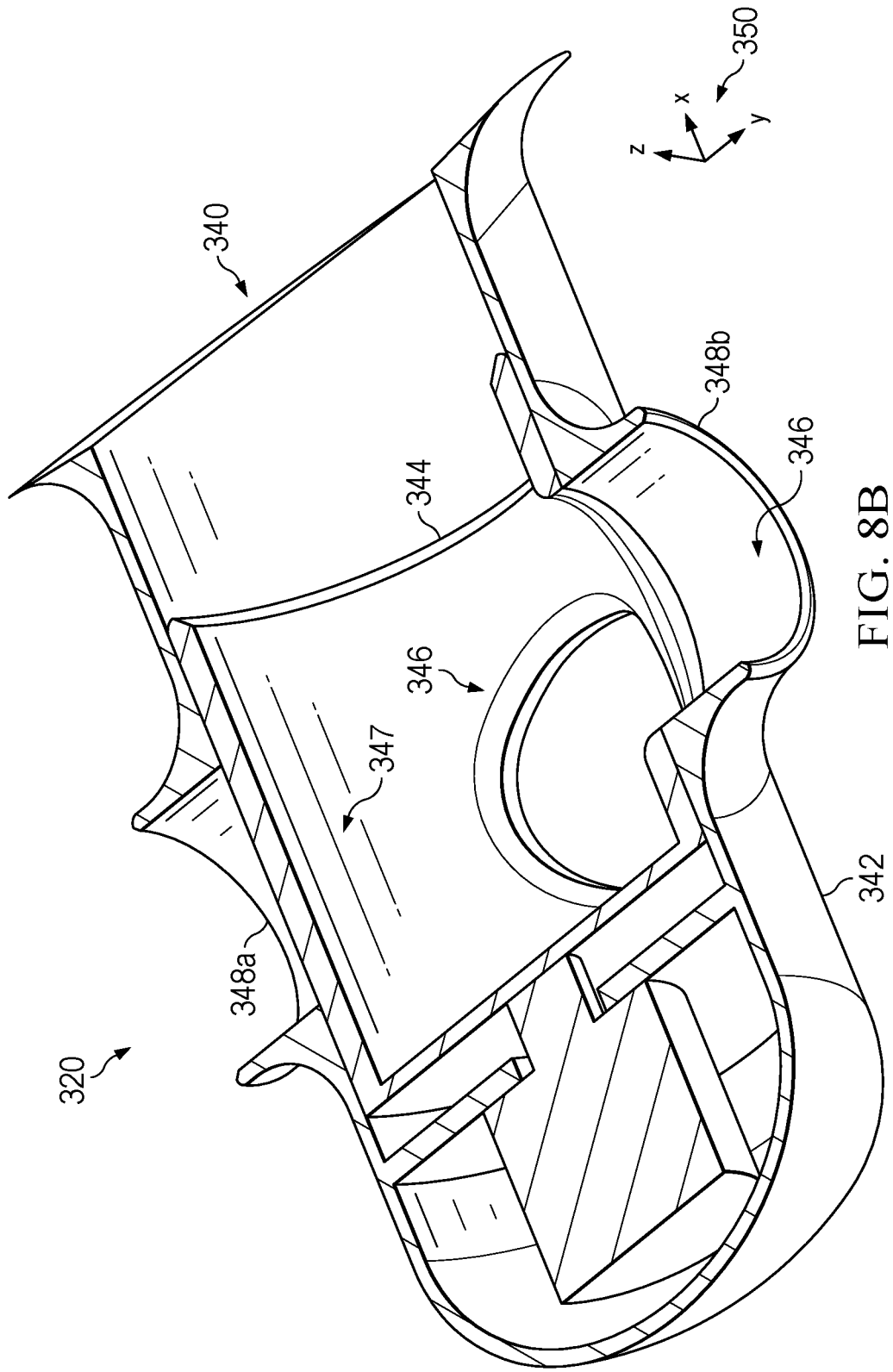
FIG. 8B shows a cross-sectional perspective view of the extension of FIG. 5 in the second position.

As an example, and as shown in FIGS. 7A and 7B, the three-way valve 344 may be rotated 345 to the first position such that one of the pair of apertures 346 is aligned with a first extension port 348a of the pair of extension ports 348a, 348b and the stopper 347 is aligned with a second extension port 348b of the pair of extension ports 348a, 348b so as to permit an uninterrupted flow of water through the first extension port 348a in a direction 349a (e.g., parallel to a negative direction of the y-axis) and to prevent water from flowing through the second extension port 348b. As another example, and as shown in FIGS. 8A and 8B, the three-way valve 344 may be rotated 345 to the second position such that one of the pair of apertures 346 is aligned with the second extension port 348b and the stopper 347 is aligned with the first extension port 348a so as to permit an uninterrupted flow of water through the second extension port 348b in a direction 349b (e.g., parallel to a positive direction of the y-axis) and to prevent water from flowing through the first extension port 348a. In such examples, the three-way valve 344 may be continuously adjustable between the first and second positions, e.g., as commanded by a controller (not shown) communicably coupled to the three-way valve 344.

As described in detail below with reference to FIGS. 9A-10B, by releasing water from the pair of extensions 320, rotation of the external housing 302 (and thereby the wave engine 301) may be induced in either the first direction 322a or the second direction 322b about the central rotational axis 351 (e.g., extending through the plane of the various views and diagrams depicted in FIGS. 9A-10B and parallel to the z-axis) to tangentially adjust translational motion of the external housing 302 (and thereby the wave engine 301) along the surface of the body of water. The first and second directions 322a, 322b may respectively correspond, for example, to counterclockwise and clockwise directions of rotation (e.g., with respect to the z-axis). In additional or alternative examples, the translational motion of the external housing 302 may be adjusted by releasing water from one or both of the pair of upper apertures 332 (e.g., by adjusting rotation of the external housing 302 and/or propelling the external housing 302 along the surface of the body of water).

Figure 9B:
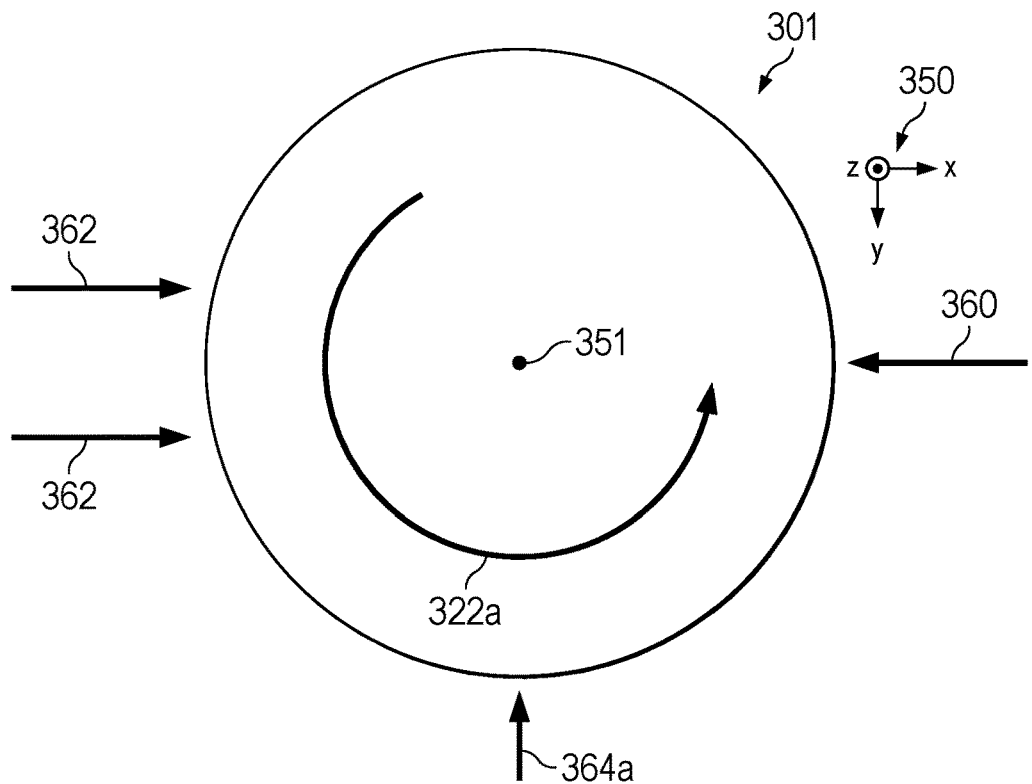
FIG. 9B shows a simplified force diagram of the wave engine of FIG. 3 configured to rotate in the first direction.
Figure 10A:
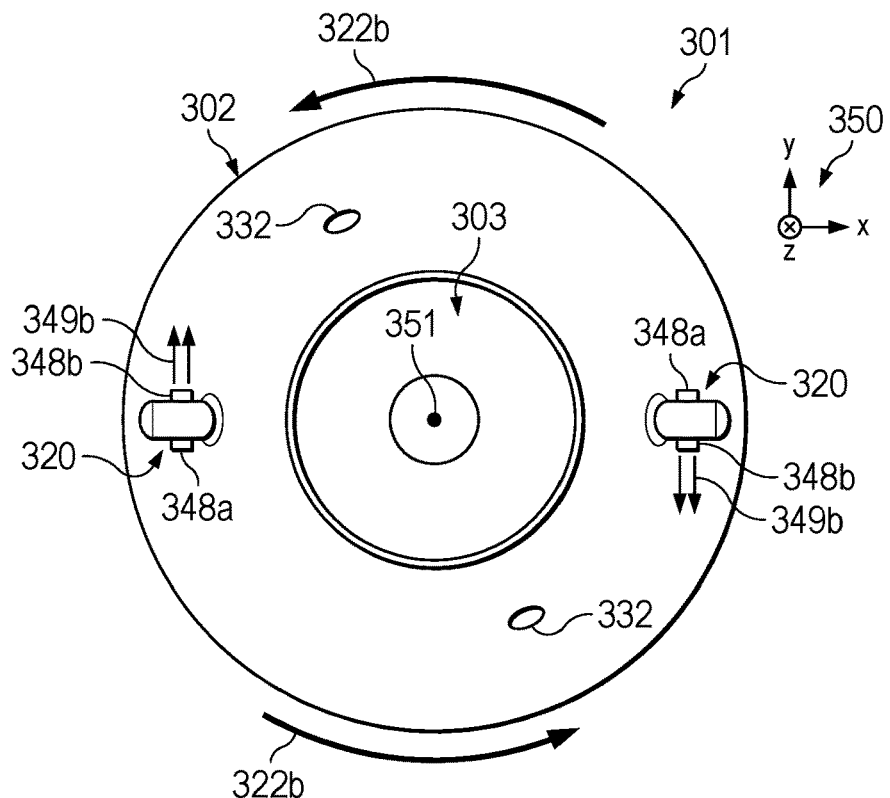
FIG. 10A shows a bottom view of the wave engine of FIG. 3 configured to rotate in a second direction.
Figure 10B:
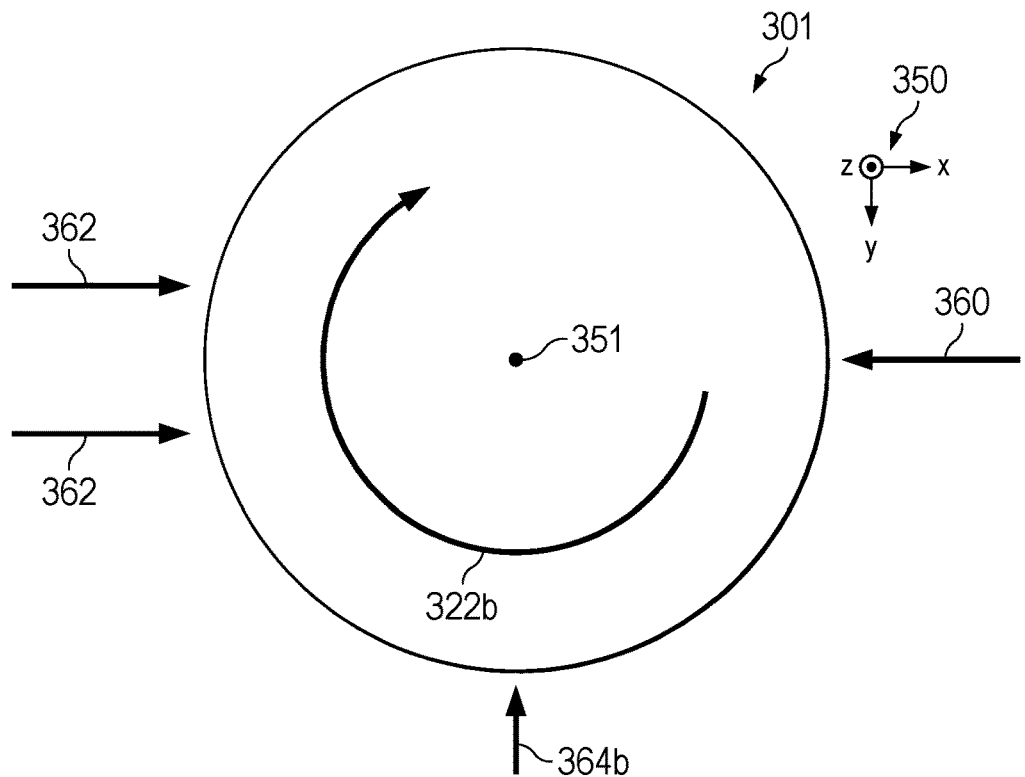
FIG. 10B shows a simplified force diagram of the wave engine of FIG. 3 configured to rotate in the second direction.

In an example embodiment, the induced rotation of the external housing 302 may adjust the translational motion of the external housing 302 via a first lift force 364a or a second lift force 364b resulting from a Magnus effect generated by the induced rotation. Specifically, the wave engine 301 may be subject to a first ambient force 360 (e.g., along a negative direction of the x-axis) from an ambient current in the body of water and/or a second ambient force 362 (e.g., along a positive direction of the x-axis) from wind, e.g., from the wind itself or water wave motion induced by the wind, where the second ambient force 362 may induce relative translational motion of the wave engine 301 with respect to the first ambient force 360 (and thereby with respect to a position of the wave engine 301 within the body of water). As an example, when the second ambient force 362 is present and the external housing 302 rotates in the first direction 322a, a Magnus effect may be generated resulting in the first lift force 364a (e.g., along the negative direction of the y-axis; as shown in FIG. 9B). As another example, when the second ambient force 362 is present and the external housing 302 rotates in the second direction 322b, a Magnus effect may be generated resulting in the second lift force 364b (e.g., along the positive direction of the y-axis; as shown in FIG. 10B), the second lift force 364b being directed opposite to the first lift force 364a. Accordingly, by adjusting a direction in which the external housing 302 is rotated, the generated Magnus effect may result in a different sign of a resulting lift coefficient and thereby a different direction of the resulting lift force. Additionally or alternatively, by adjusting a speed at which the external housing 302 is rotated, the generated Magnus effect may result in a different magnitude of the resulting lift coefficient and thereby a different magnitude of the resulting lift force. Thus, the lift force may be dynamically adjusted responsive to at least one of a command received from the controller (not shown), a change to an ambient environmental parameter affecting the translational motion of the external housing 302, a detected obstruction in a projected path of the external housing 302, an indication that the external housing 302 may leave a defined geographic area, etc.

The first ambient force 360 may or may not be present when the Magnus effect is generated via application of the second ambient force 362. Specifically, and as described in detail above with reference to FIGS. 21A-21D, the lift force 364a or 364b may result from the combination of two primary factors: (i) a local pressure distribution asymmetry within the water surrounding the external housing 302 resulting from rotation thereof; and (ii) an external force (e.g., the second ambient force 362) applied relative to the surrounding water. If only factor (i) is present, the Magnus effect may not have an appreciable effect on translational motion of the external housing 302 without application of the external force (factor (ii)) against the local pressure distribution asymmetry.

Figure 9A:
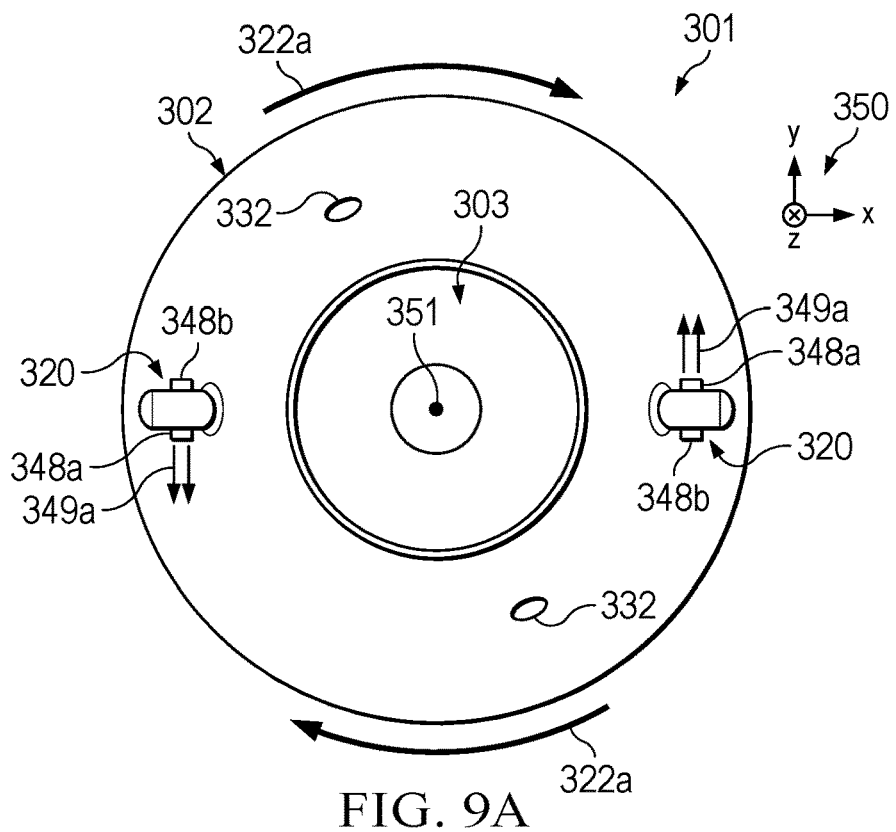
FIG. 9A shows a bottom view of the wave engine of FIG. 3 configured to rotate in a first direction.

In an example embodiment, and as shown in FIG. 9A, the pair of extensions 320 may respectively include a pair of first extension ports 348a positioned on opposite sides of the external housing 302 with respect to the central rotational axis 351 and angled so as to release water from within the internal reservoir 336 (not shown at FIG. 9A) in opposing, parallel directions 349a (e.g., respectively parallel to the negative and positive directions of the y-axis and substantially tangential to an outer surface of the external housing 302). As such, when water directed through the internal reservoir 336 is released via the pair of first extension ports 348a in the opposing, parallel directions 349a, the external housing 302 may rotate in the first direction 322a. Additionally or alternatively, and as shown in FIG. 10A, the pair of extensions 320 may respectively include a pair of second extension ports 348b positioned on opposite sides of the external housing 302 with respect to the central rotational axis 351 and angled so as to release the water from within the internal reservoir 336 (not shown at FIG. 10A) in opposing, parallel directions 349b (e.g., respectively parallel to the positive and negative directions of the y-axis). As such, when the water directed through the internal reservoir 336 is released via the pair of second extension ports 348b in the opposing, parallel directions 349b, the external housing 302 may rotate in the second direction 322b.

In certain embodiments, water may be selectively released through either the pair of first extension ports 348a or the pair of second extension ports 348b so as to rotate the external housing 302 in either the first direction 322a or the second direction 322b. For example, the pair of extensions 320 may respectively include a pair of three-way valves 344 fluidly coupled to the internal reservoir 336 so as to receive water directed therethrough. In such an example, when each of the pair of three-way valves 344 is adjusted to the first position of FIGS. 7A and 7B, the pair of three-way valves 344 may be configured to release water received from the internal reservoir 336 through the pair of first extension ports 348a to induce rotation of the external housing 302 in the first direction 322a. Additionally or alternatively, when each of the pair of three-way valves 344 is adjusted to the second position of FIGS. 8A and 8B, the pair of three-way valves 344 may be configured to release the water received from the internal reservoir 336 through the pair of second extension ports 348b to induce rotation of the external housing 302 in the second direction 322b.

Figure 11:
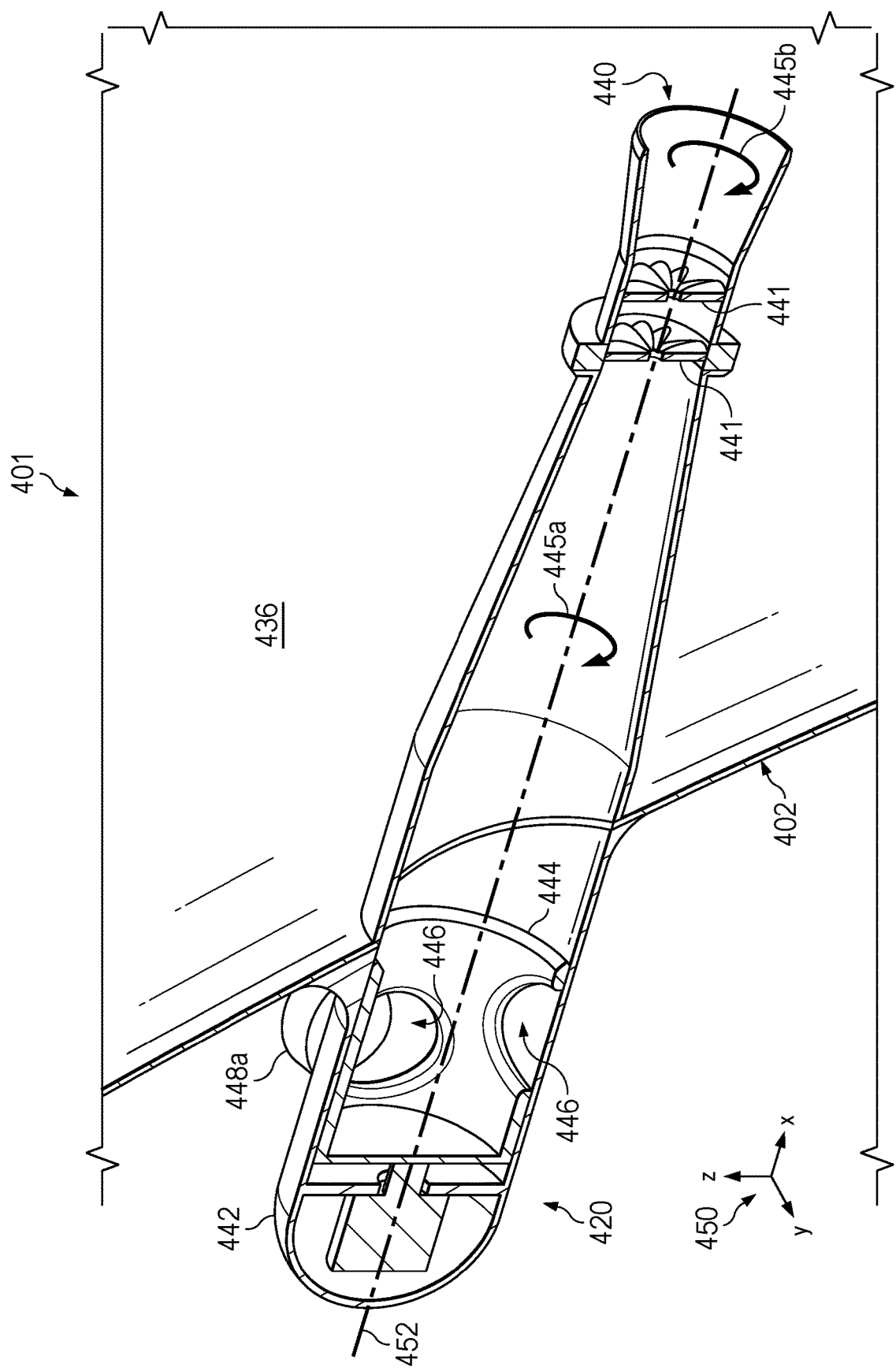
FIG. 11 shows a cross-sectional perspective view of an extension of a wave engine, in accordance with an embodiment of the present disclosure.
Figure 12:
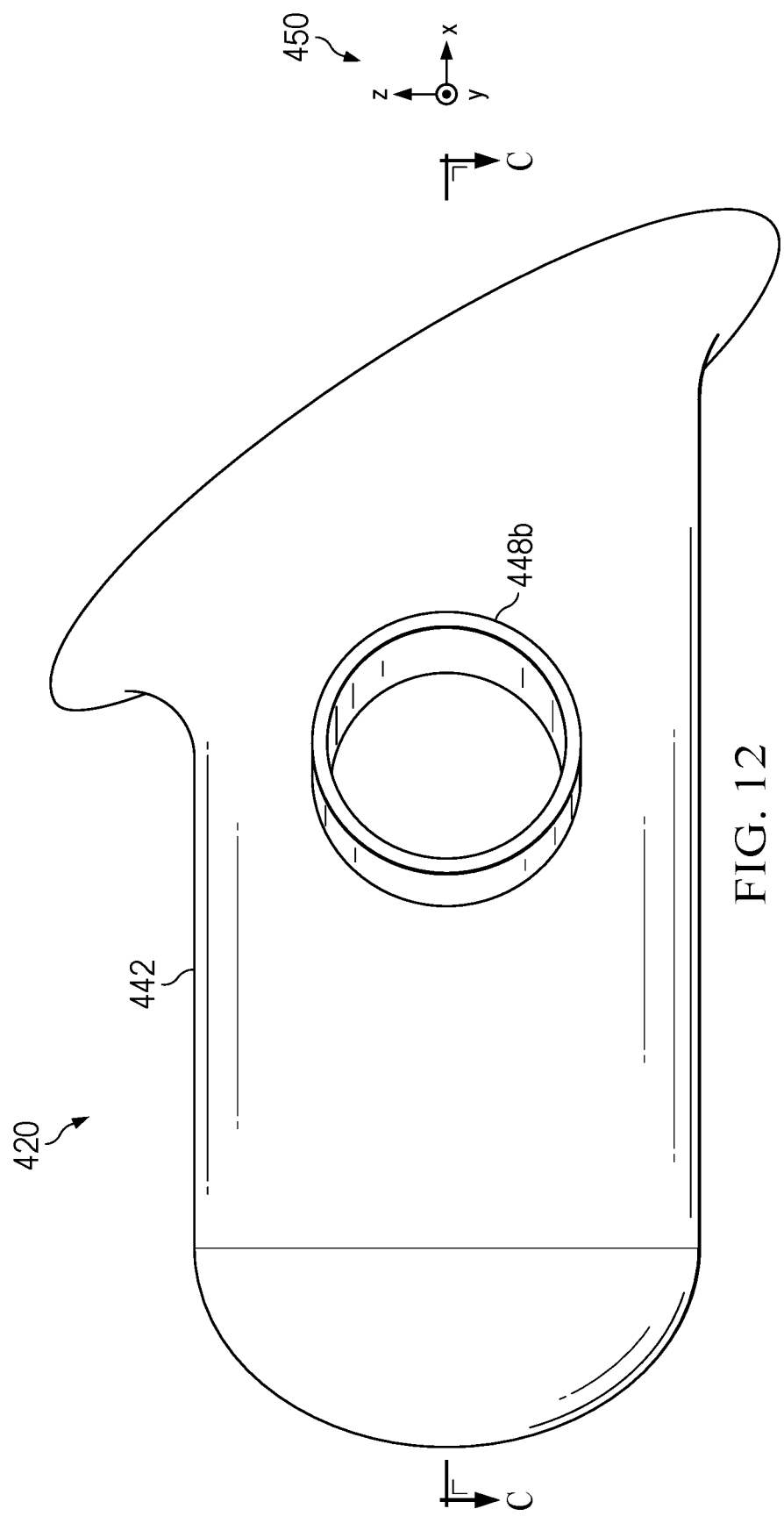
FIG. 12 shows a side view of the extension of FIG. 11.
Figure 13A:
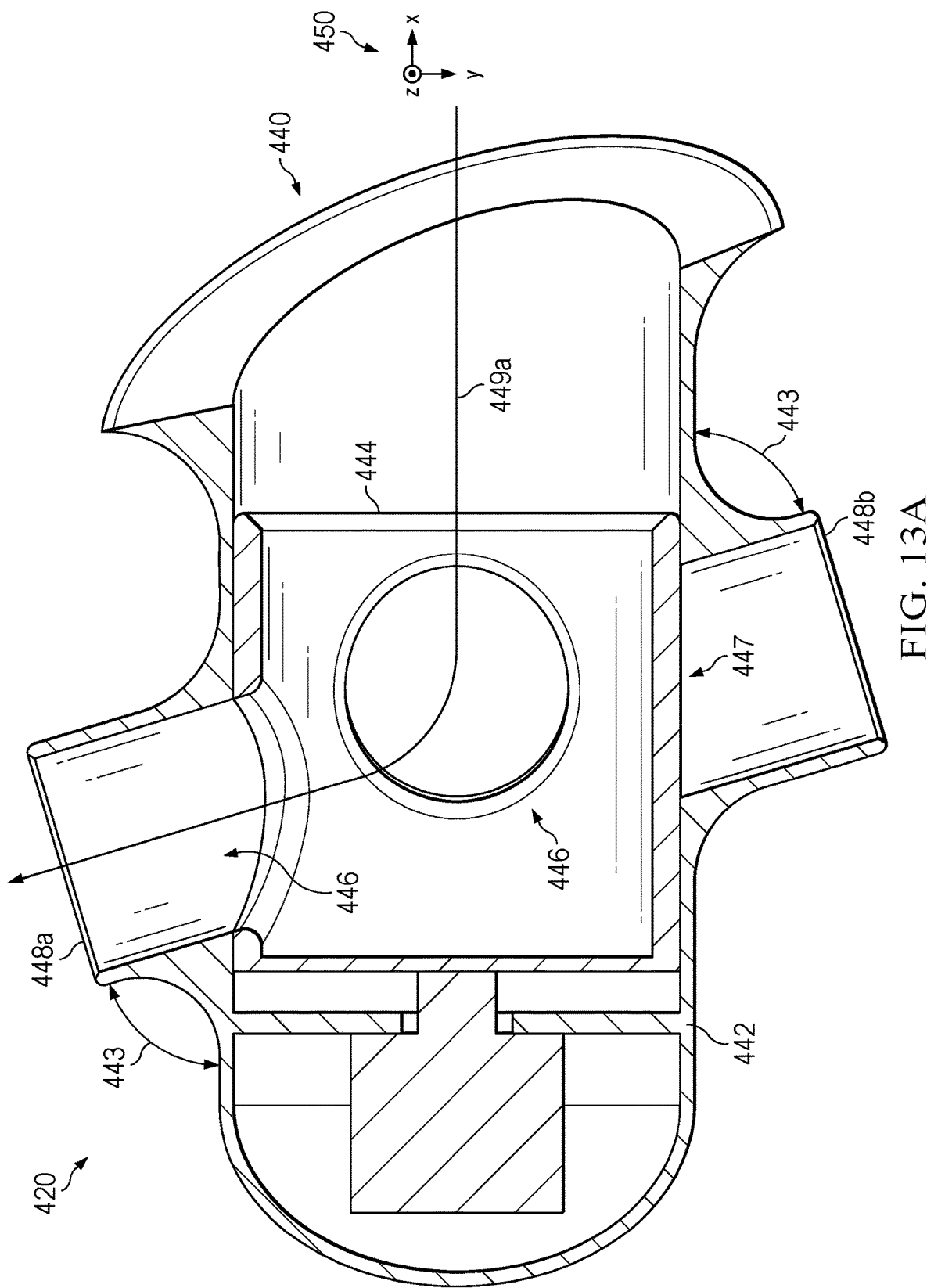
FIG. 13A shows a cross-sectional view of the extension of FIG. 11 configured in a first position.
Figure 13B:
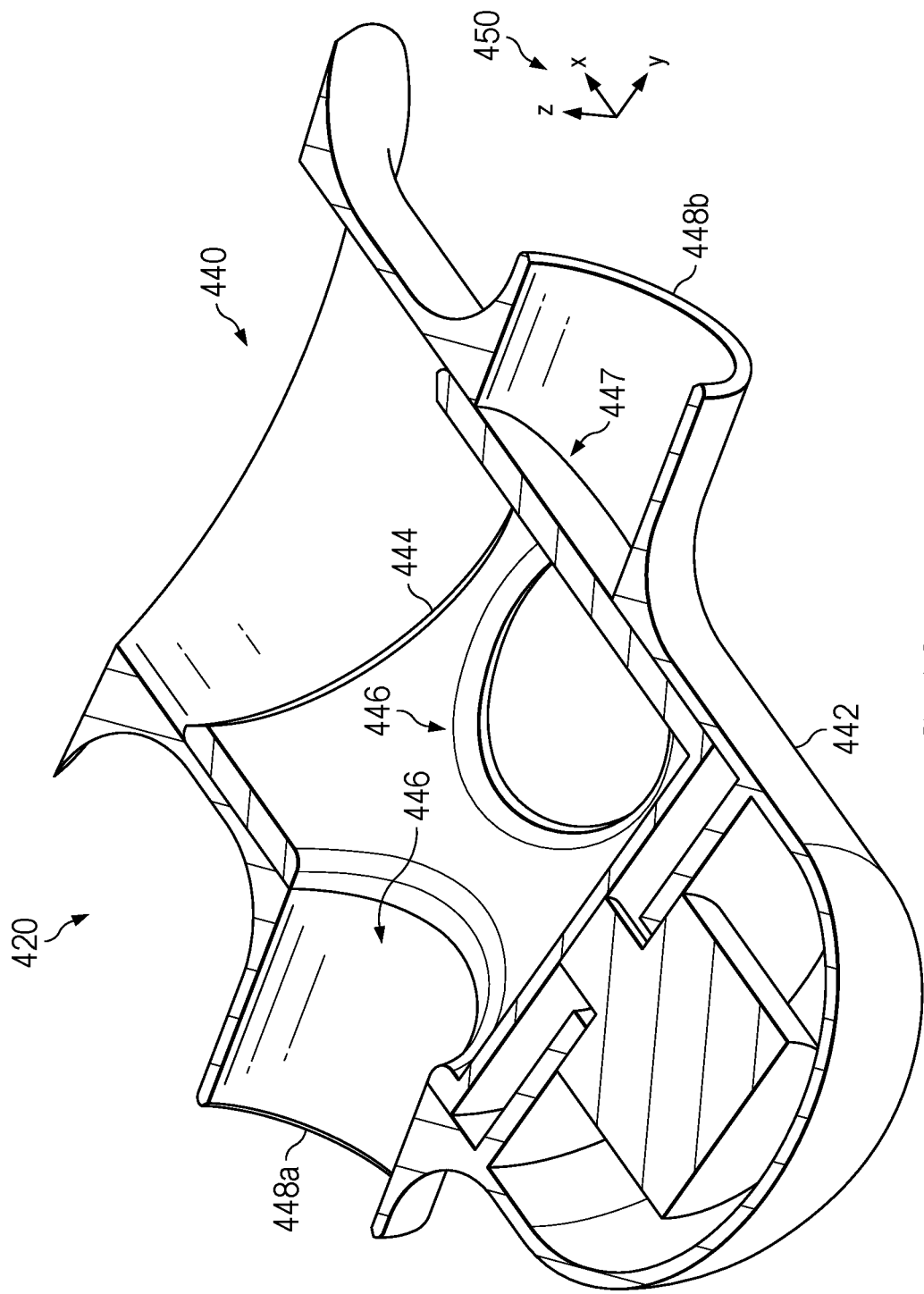
FIG. 13B shows a cross-sectional perspective view of the extension of FIG. 11 configured in the first position.
Figure 14B:
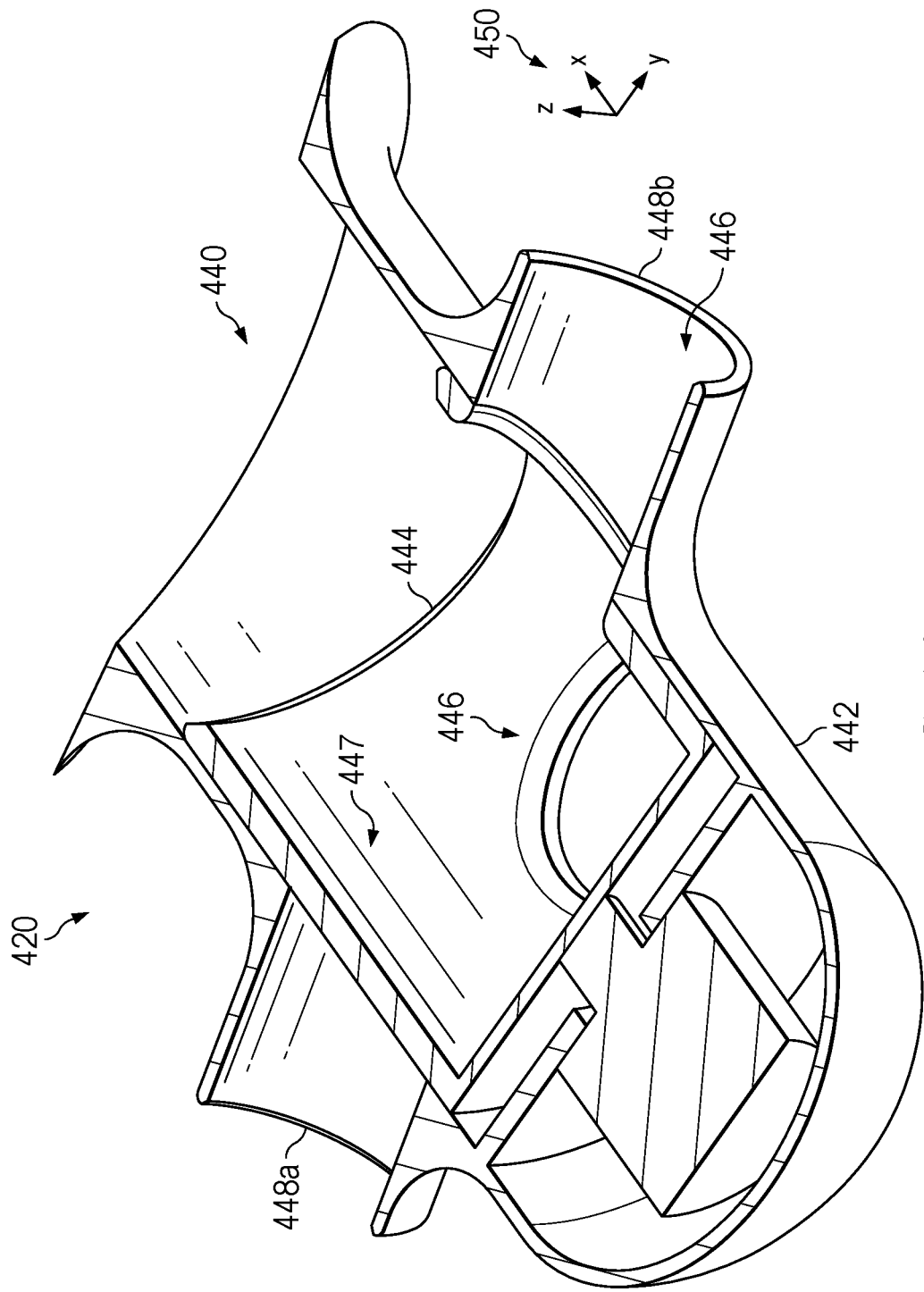
FIG. 14B shows a cross-sectional perspective view of the extension of FIG. 11 configured in the second position.

Referring now to FIGS. 11-14B, various views of a wave engine 401 and individual components thereof, including a pair of extensions 420, are depicted. In an example embodiment, the wave engine 401 may include an external or exterior housing 402 and the pair of extensions 420 outwardly protruding from the external housing 402, the pair of extensions 420 operable to rotate the wave engine 401 in a body of water (not shown at FIGS. 11-14B) by releasing water from within the wave engine 401, e.g., as propelled by one or more of a plurality of inboard turbines 441 (though referred to herein as "the plurality of inboard turbines 441," the inboard turbines 441 may not be configured exclusively for energy capture and may additionally or alternatively provide propulsion, e.g., as propellors, to induce water flow within the wave engine 401) positioned within an extension passage 440 of each of the pair of extensions 420. Specifically, in FIGS. 11-14B, one extension 420 of the pair of extensions 420 is shown in detail. A cross-sectional perspective view of the extension 420 is shown in FIG. 11 and a side view of the extensions 420 is shown in FIG. 12. A cross-sectional view and a cross-sectional perspective view shown in FIGS. 13A and 13B, respectively, depict the extension 420 of FIGS. 11 and 12 in a first position, and a cross-sectional view and a cross-sectional perspective view shown in FIGS. 14A and 14B, respectively, depict the extension 420 of FIGS. 11 and 12 in a second position. The various cross-sectional views of FIGS. 13A-14B are taken along a cutline C-C depicted in FIG. 12. Hereinbelow, description of FIGS. 11-14B is concatenated and each of FIGS. 11-14B may be referred to interchangeably where relevant. For example, reference may be made to one or more specific figures when one or more of FIGS. 11-14B illustrate a given component or aspect of the wave engine 401 with at least some particularity.

In some embodiments, the wave engine 401 may be positioned in a wave energy harvesting system, such as the wave energy harvesting system 100 described in detail above with reference to FIG. 1. As such, in one example, the wave engine 401 may replace the free-floating body 101 of the wave energy harvesting system 100 of FIG. 1. Moreover, in such an example, the wave engine 401 may be assembled and configured similarly to the free-floating body 101 of FIG. 1 and may operate in a substantially similar manner in practice. Additionally or alternatively, the wave engine 401 may be assembled and configured similarly to the wave engine 201 of FIG. 2 and may operate in a substantially similar manner in practice. Accordingly, excepting minor configurational differences, the description of the free-floating body 101 provided above with reference to FIG. 1 and/or the description of the wave engine 201 provided above with reference to FIG. 2 may be additionally applied to the wave engine 401 depicted in FIGS. 11-14B in some embodiments. In certain embodiments, additional components and/or functionalities may be included in the wave engine 401 which were not described in detail above with reference to FIGS. 1 and 2 and which may additionally be applied to the free-floating body 101 depicted in FIG. 1 or the wave engine 201 depicted in FIG. 2. Similarly, additional components and/or functionalities which are described in detail with reference to a subset of the embodiments depicted in FIGS. 11-14B may be additionally applied to remaining embodiments depicted in FIGS. 11-14B.

In an example embodiment, the wave engine 401 of FIGS. 11-14B may be assembled and configured similarly to the wave engine 301 of FIGS. 3-10B and may operate in a substantially similar manner in practice. The primary differences between the wave engine 301 of FIGS. 3-10B and the wave engine 401 of FIGS. 11-14B include the plurality of inboard turbines 441 of wave engine 401 and an angle 443 at which extension ports 448a, 448b may be positioned with respect to the external housing 402 of the wave engine 401, which will be discussed in greater detail below. Excepting certain assembly and operational aspects which may arise from such differences, the description provided above with reference to FIGS. 3-10B may be additionally applied to the embodiment(s) depicted in FIGS. 11-14B. In certain embodiments, additional subsystems and/or functionalities may also be included in the wave engine 401 which were not described in detail above with reference to FIGS. 3-10B and which may be additionally applied to the embodiments depicted in FIGS. 3-10B.

To indicate suitability for substitution in certain non-limiting embodiments, similar reference indicators have been applied to elements which may be interchangeable with one another. For example, elements depicted in FIGS. 11-14B may be labeled with the same numbers for the "tens" and "ones" positions as those elements in FIGS. 1-10B and 21A-21D which may be interchangeable in such examples, but may utilize a "4" in the "hundreds" position instead of a "1," a "2," or a "3" (e.g., the external housing 402 of the wave engine 401 of FIGS. 11-14B and the external housing 102 of the free-floating body 101 of FIG. 1 may be interchangeable in certain non-limiting embodiments). As such, in certain embodiments, description of any such interchangeable elements described hereinabove may substitute or supplement description provided below with reference to FIGS. 11-14B. Alphabetical indicators may indicate a relationship between two elements which are nonequivalent in orientation but substantially alike otherwise (e.g., "449a" and "449b," as described hereinbelow).

A set of Cartesian coordinate axes 450 is shown in FIGS. 11-14B for contextualizing positions of the various components of the wave engine 401 and for comparing between the various views of FIGS. 11-14B. Specifically, x-, y-, and z-axes are provided which are mutually perpendicular and/or orthogonal to one another, where: (i) the x- and z-axes are parallel to a plane of the side view shown in FIG. 12 and the y-axis is perpendicular thereto; (ii) the x- and y-axes are parallel to a plane including the cutline C-C shown in FIG. 12 and the z-axis is perpendicular thereto; and (iii) the x- and y-axes are parallel to a plane of each of the cross-sectional views shown in FIGS. 13A and 14A and the z-axis is perpendicular thereto. In some embodiments, a direction of gravity may be parallel to and coincident with a negative direction of the z-axis.

In some embodiments, each given extension 420 of the pair of extensions 420 may include one or more inboard turbines 441 of the plurality of inboard turbines 441 positioned within an extension passage 440 of the given extension 420. In an example embodiment, and as shown in FIG. 11, the one or more inboard turbines 441 may rotate 445b about an extension rotational axis 452 so as to capture energy from (and/or propel) water flowing from within the internal reservoir 436 and through the extension passage 440 of the given extension 420 to one of the extension ports 448a, 448b. In one example, the one or more inboard turbines 441 may rotate 445b in a same direction as rotation 445a of a three-way valve 444. In another example, the one or more inboard turbines 441 may rotate 445b in an opposing direction from the rotation 445a of the three-way valve 444. In certain embodiments, the rotation 445a and/or the rotation 445b may be selectively reversed [e.g., responsive to a command from a controller (not shown)].

In some embodiments, each of the extension ports 448a, 448b may extend from an extension housing 442 at the angle 443. As an example, the angle 443 may be 90° (for instance, the extension ports 348a, 348b of FIGS. 3-10B are correspondingly depicted extending from the extension housing 342 at an angle of 90°). As another example, the angle 443 may be greater than 0° and less than 90°. In an example embodiment, the angle 443 may be selected based on a relative positioning of the pair of extensions 420 on the external housing 402. For instance, because the pair of extensions 420 may be positioned off-center on the external housing 402 (e.g., one extension 420 positioned above an intersecting plane parallel to a plane defined by the x- and y-axes and the other extension 420 positioned below the intersecting plane), the extension ports 448a and/or 448b may be angled at the angle 443 so as to release water from the internal reservoir 436 tangentially to the external housing 402 (e.g., so as to account for the off-center positioning of the pair of extensions 420).

Figure 15:
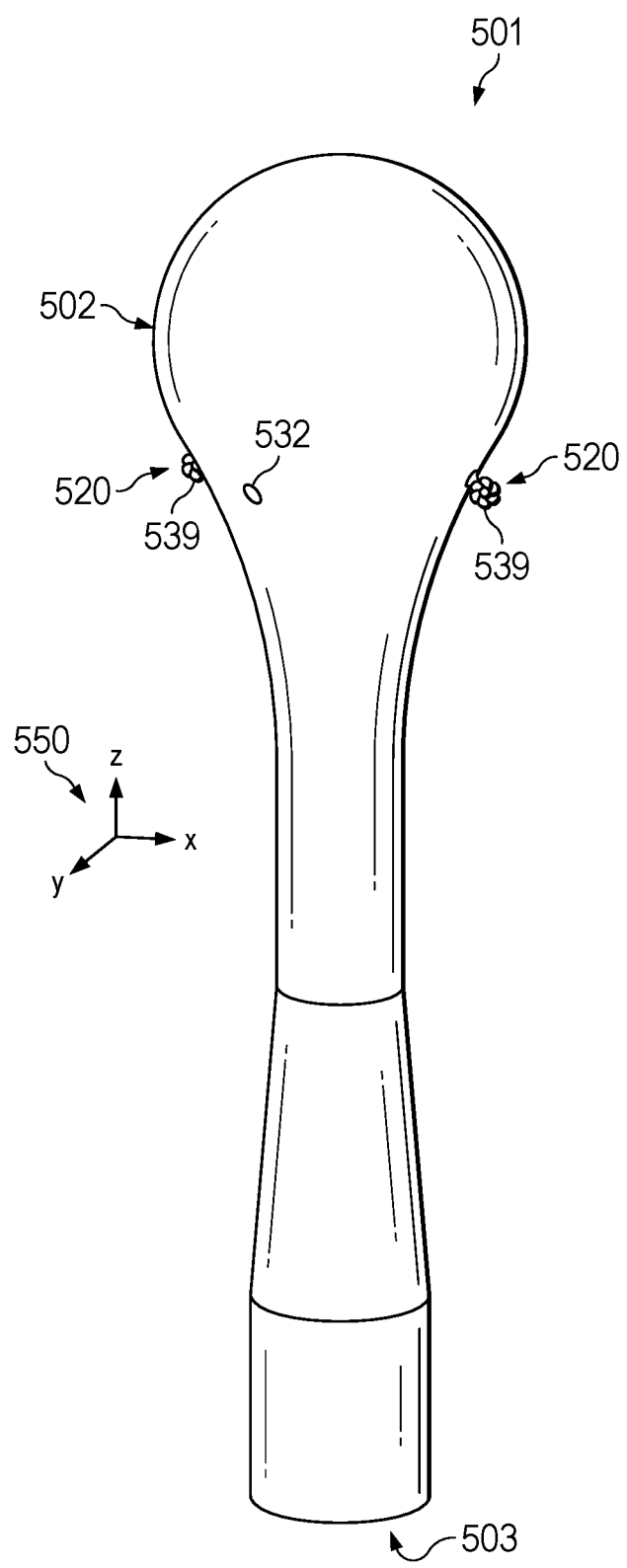
FIG. 15 shows a perspective view of another wave engine in accordance with at least one embodiment of the present disclosure.
Figure 16:
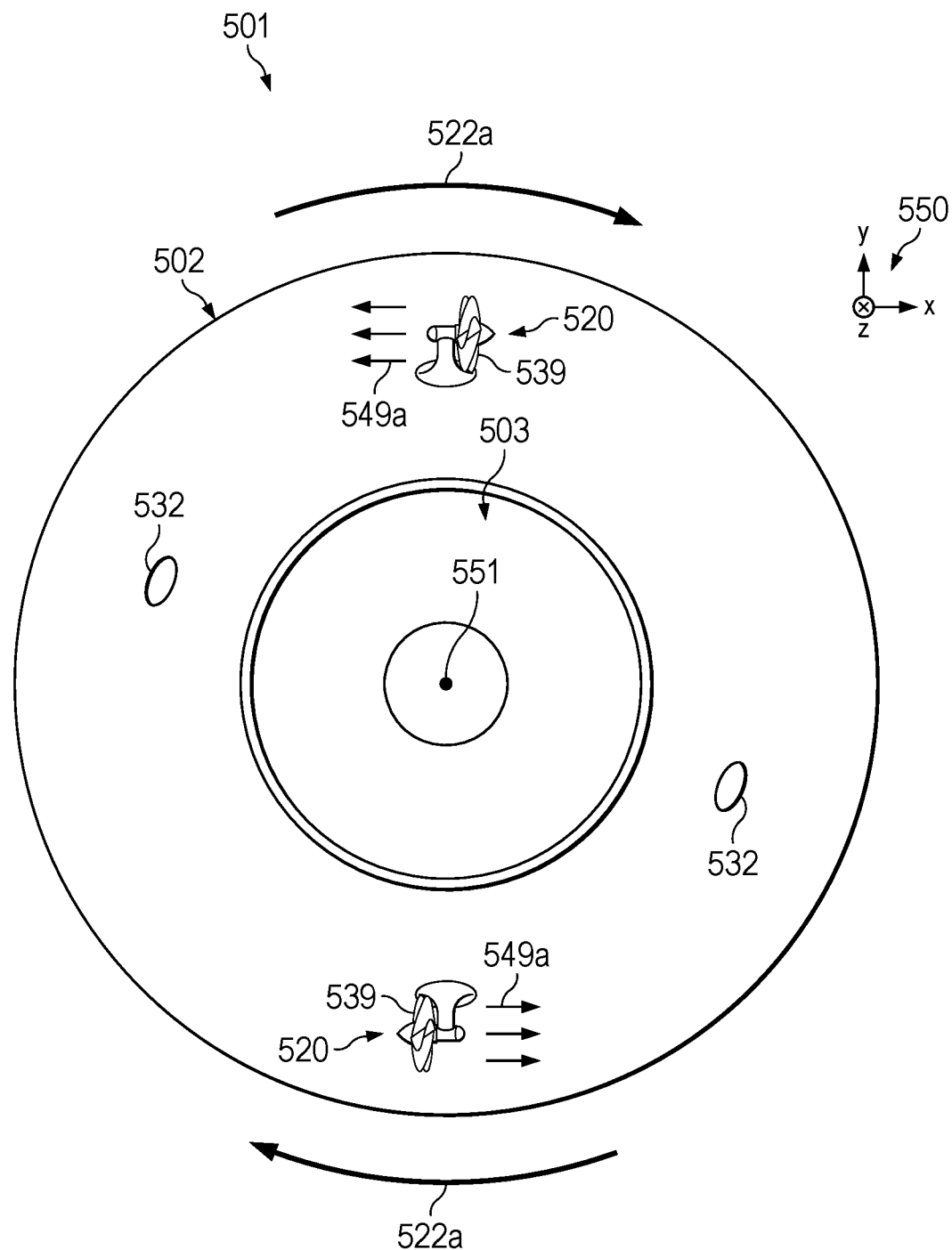
FIG. 16 shows a bottom view of the wave engine of FIG. 15 configured to rotate in a first direction.
Figure 17:
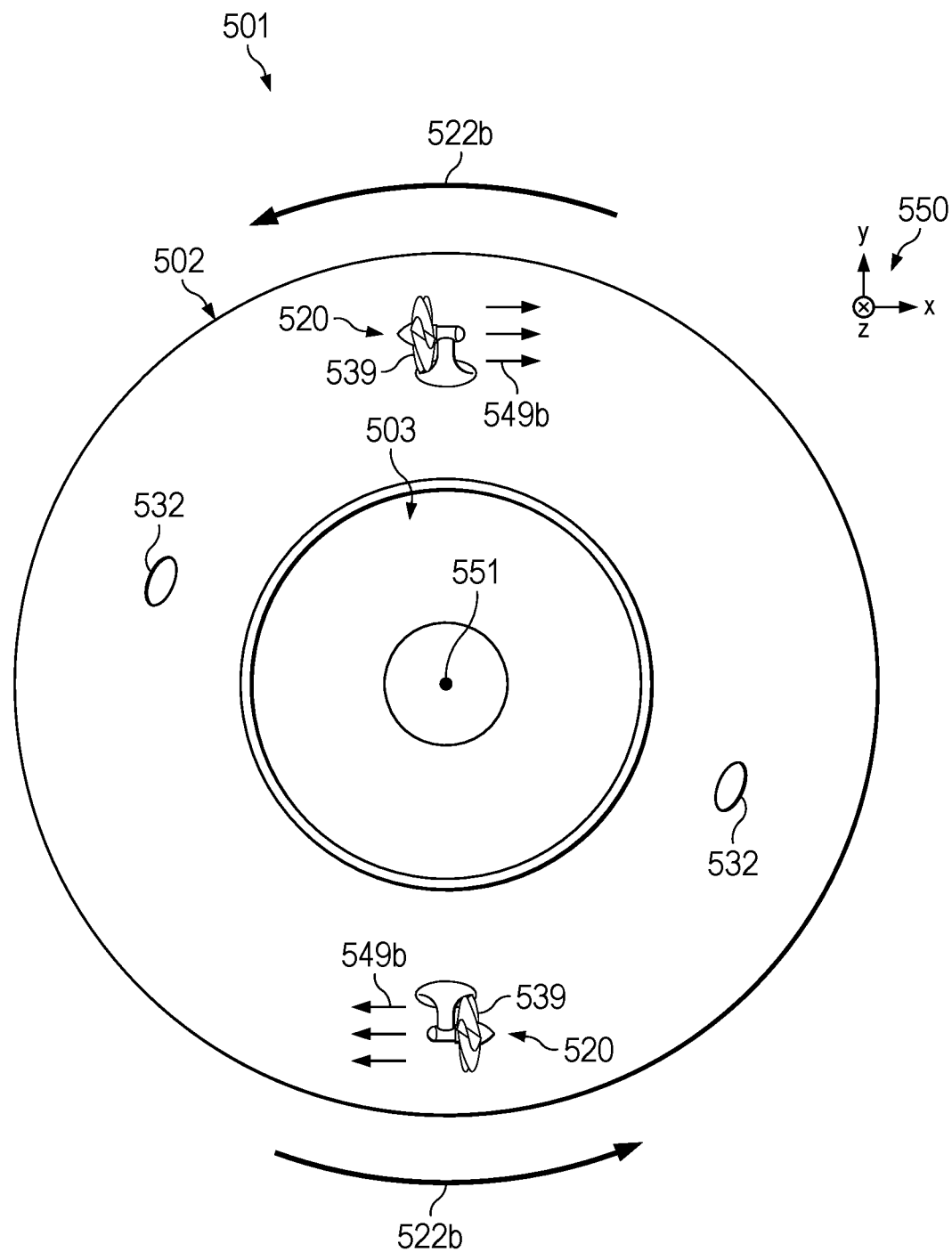
FIG. 17 shows a bottom view of the wave engine of FIG. 15 configured to rotate in a second direction.
Figure 18:
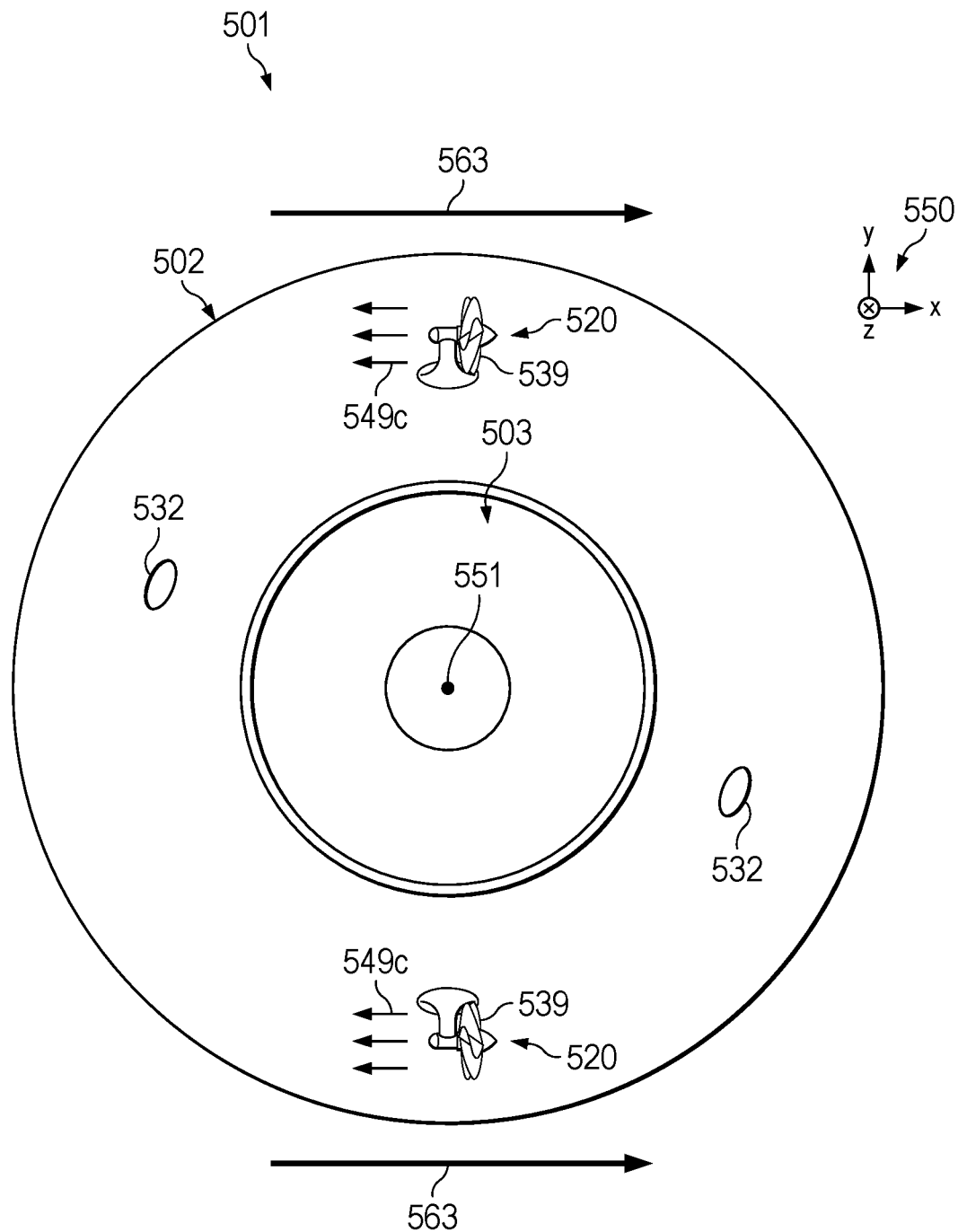
FIG. 18 shows a bottom view of the wave engine of FIG. 15 as configured to translate without rotation.

Referring now to FIGS. 15-18, various views of a wave engine 501 and individual components thereof are depicted. A perspective view of the wave engine 501 including an external or exterior housing 502 and a pair of extensions 520 outwardly protruding from the external housing 502, the pair of extensions 520 operable to rotate the wave engine 501 in a body of water (not shown at FIGS. 15-18) by propelling water therein via a pair of outboard propellors 539 respectively included as components of the pair of extensions 520, is shown in FIG. 15. A bottom view shown in FIG. 16 depicts the wave engine 501 as configured to rotate in a first direction 522a about a central rotational axis 551, a bottom view shown in FIG. 17 depicts the wave engine 501 as configured to rotate in a second direction 522b about the central rotational axis 551, and a bottom view shown in FIG. 18 depicts the wave engine 501 as configured to translate in a third direction 521, where the rotation shown in FIGS. 16 and 17 and the translation shown in FIG. 18 may be induced by operating the pair of extensions 520 (e.g., by operating the pair of outboard propellors 539 thereof) to propel the water in the body of water. Hereinbelow, description of FIGS. 15-18 is concatenated and each of FIGS. 15-18 may be referred to interchangeably where relevant. For example, reference may be made to one or more specific figures when one or more of FIGS. 15-18 illustrate a given component or aspect of the wave engine 501 with at least some particularity.

In some embodiments, the wave engine 501 may be positioned in a wave energy harvesting system, such as the wave energy harvesting system 100 described in detail above with reference to FIG. 1. As such, in one example, the wave engine 501 may replace the free-floating body 101 of the wave energy harvesting system 100 of FIG. 1. Moreover, in such an example, the wave engine 501 may be assembled and configured similarly to the free-floating body 101 of FIG. 1 and may operate in a substantially similar manner in practice. Additionally or alternatively, the wave engine 501 may be assembled and configured similarly to the wave engine 201 of FIG. 2 and may operate in a substantially similar manner in practice. Accordingly, excepting minor configurational differences, the description of the free-floating body 101 provided above with reference to FIG. 1 and/or the description of the wave engine 201 provided above with reference to FIG. 2 may be additionally applied to the wave engine 501 depicted in FIGS. 15-18 in some embodiments. In certain embodiments, additional components and/or functionalities may be included in the wave engine 501 which were not described in detail above with reference to FIGS. 1 and 2 and which may additionally be applied to the free-floating body 101 depicted in FIG. 1 or the wave engine 201 depicted in FIG. 2. Similarly, additional components and/or functionalities which are described in detail with reference to a subset of the embodiments depicted in FIGS. 15-18 may be additionally applied to remaining embodiments depicted in FIGS. 15-18.

In an example embodiment, the wave engine 501 of FIGS. 15-18 may be assembled and configured similarly to the wave engine 301 of FIGS. 3-10B and/or the wave engine 401 of FIGS. 11-14B and may operate in a substantially similar manner in practice. The primary difference between the wave engines 301, 401 of FIGS. 3-14B and the wave engine 501 of FIGS. 15-18 includes the plurality of outboard propellors 539, which will be discussed in greater detail below. Excepting certain assembly and operational aspects which may arise from such differences, the description provided above with reference to FIGS. 3-14B may be additionally applied to the embodiment(s) depicted in FIGS. 15-18. In certain embodiments, additional subsystems and/or functionalities may also be included in the wave engine 501 which were not described in detail above with reference to FIGS. 3-14B and which may be additionally applied to the embodiments depicted in FIGS. 3-14B.

To indicate suitability for substitution in certain non-limiting embodiments, similar reference indicators have been applied to elements which may be interchangeable with one another. For example, elements depicted in FIGS. 15-18 may be labeled with the same numbers for the "tens" and "ones" positions as those elements in FIGS. 1-14B and 21A-21D which may be interchangeable in such examples, but may utilize a "5" in the "hundreds" position instead of a "1," a "2," a "3," or a "4" (e.g., the external housing 502 of the wave engine 501 of FIGS. 15-18 and the external housing 102 of the free-floating body 101 of FIG. 1 may be interchangeable in certain non-limiting embodiments). As such, in certain embodiments, description of any such interchangeable elements described hereinabove may substitute or supplement description provided below with reference to FIGS. 15-18. Alphabetical indicators may indicate a relationship between two elements which are nonequivalent in orientation but substantially alike otherwise (e.g., "549a," "549b," and "549c," as described hereinbelow).

A set of Cartesian coordinate axes 550 is shown in FIGS. 15-18 for contextualizing positions of the various components of the wave engine 501 and for comparing between the various views of FIGS. 15-18. Specifically, x-, y-, and z-axes are provided which are mutually perpendicular and/or orthogonal to one another, where the x- and y-axes are parallel to a plane of each of the bottom views shown in FIGS. 16-18 and the z-axis is perpendicular thereto. In some embodiments, a direction of gravity may be parallel to and coincident with a negative direction of the z-axis.

In some embodiments, and as shown in FIG. 16, the pair of extensions 520 may respectively include a pair of outboard propellors 539 positioned on opposite sides of the external housing 502 with respect to the central rotational axis 551 and angled so as to direct water outside of the external housing 502 in opposing, parallel directions 549a (e.g., respectively parallel to negative and positive directions of the x-axis). As such, when water in the body of water is directed via the pair of outboard propellors 539 in the opposing, parallel directions 549a, the external housing 502 may rotate in the first direction 522a (e.g., a counterclockwise direction of rotation with respect to the z-axis). Additionally or alternatively, and as shown in FIG. 17, the pair of outboard propellors 539 may be angled to direct water outside of the external housing 502 in opposing, parallel directions 549b (e.g., respectively parallel to the positive and negative directions of the x-axis). As such, when water in the body of water is directed via the pair of outboard propellors 539 in the opposing, parallel directions 549b, the external housing 502 may rotate in the second direction 522b (e.g., a clockwise direction of rotation with respect to the z-axis). Additionally or alternatively, and as shown in FIG. 18, the pair of outboard propellors 539 may be angled to direct water outside of the external housing 502 in aligned, parallel directions 549c (e.g., parallel to the negative direction of the x-axis). As such, when water in the body of water is directed via the pair of outboard propellors 539 in the aligned, parallel directions 549c, the external housing 502 may translate in the third direction 563 (e.g., translation in the positive direction of the x-axis). Moreover, by directing water in the body of water in the aligned, parallel directions 549c, a direction and/or a magnitude of the translational motion of the external housing 502 may be adjusted directly, e.g., without rotation of the external housing 502.

In additional or alternative embodiments, translation of the external housing 502, e.g., in the third direction 563, may be realized via a dedicated translational propellor angled to direct water away from the external housing 502, e.g., along an axis intersecting with and perpendicular to the central rotational axis 551, such as an axis parallel to the x-axis. As such, by directing water in the body of water away from the external housing 502 in only one direction, e.g., opposing the third direction 563, the direction and/or the magnitude of the translational motion of the external housing 502 may be adjusted directly, e.g., without rotation of the external housing 502.

In certain embodiments, rotation of each of the pair of outboard propellors 539 may be independently controlled so as to be selectively reversible and thereby realize rotation in either the first direction 522a or the second direction 522b or translation in the third direction 563 as dependent on a requested adjustment to the translational motion.

Figure 19:
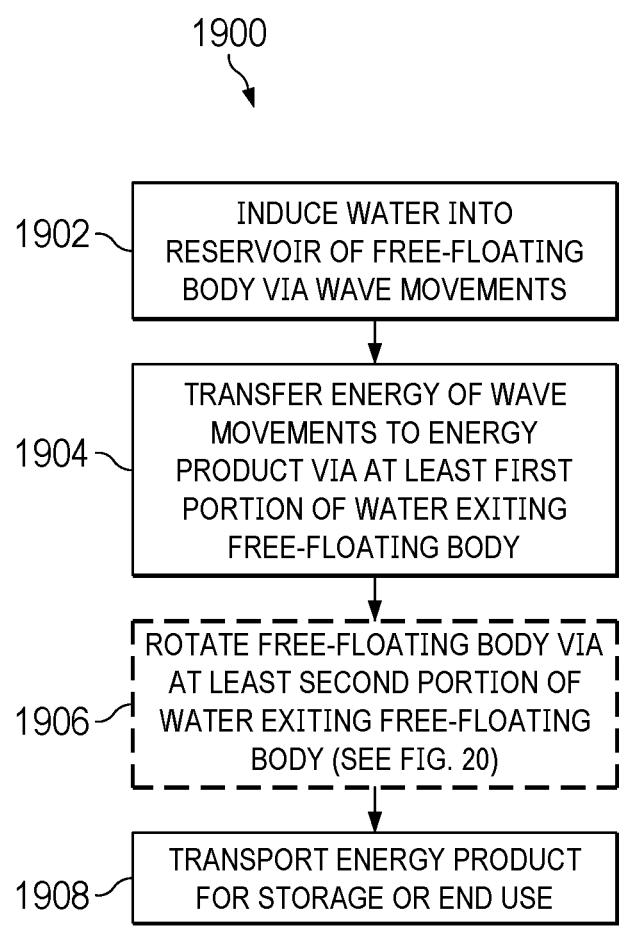
FIG. 19 shows a block diagram for a method for utilizing a free-floating body to capture energy from wave movements in a body of water, in accordance with at least one embodiment of the present disclosure.

Referring now to FIG. 19, a block diagram of a method 1900 for utilizing a free-floating body, such as any of the free-floating bodies or wave engines variously described in detail above with reference to FIGS. 1-18 and 21A-21D, to capture energy from wave movements in a body of water is shown. In an example embodiment, water may pass through the free-floating body, induced and pressurized, at least in part, by the wave movements, exiting via one or more apertures in the free-floating body. In some embodiments, at least a first portion of the water exiting the free-floating body may drive conversion of the captured energy into an energy product. In additional or alternative embodiments, and as described in greater detail below with reference to FIG. 20, at least a second portion of the water exiting the free-floating body may be leveraged to induce rotation of the free-floating body.

In some embodiments, the method 1900, or a portion thereof, may be implemented as executable instructions stored in non-transitory memory of a computing device, such as a controller communicably coupled to one or more actuators of the free-floating body. However, embodiments of methods for utilizing free-floating bodies to capture energy from water wave movements are not limited to the below description of the method 1900. For instance, in certain embodiments, additional or alternative sequences of steps may be implemented, e.g., as executable instructions on such a computing device, where individual steps discussed with reference to the method 1900 may be added, removed, substituted, modified, or interchanged. As one example, block 1906 is represented in dashing to indicate that implementation of the block 1906 is optional in some embodiments (such as when no rotation of the free-floating body is requested).

At block 1902, the method 1900 may include inducing water into a reservoir of the free-floating body via water wave movements. Specifically, a first aperture may permit oscillatory water wave movements into a fluid passage housed within the free-floating body.

At block 1904, the method 1900 may include transferring energy of the water wave movements to an energy product via at least the first portion of the water exiting the free-floating body. Specifically, the fluid passage may direct the first portion of the water to a second aperture, wherefrom the first portion of the water may exit the free-floating body. As the water passes through the fluid passage, the water may be pressurized, e.g., via a shape of the fluid passage and/or by gas pressure of a captured gas enclosed within the free-floating body, so as to force the at least the first portion of the water through the second aperture. As the at least the first portion of the water flows through the fluid passage and toward the second aperture, the flowing water may drive an energy conversion process, e.g., by powering a generator included in the free-floating body via rotation of an inboard turbine, to convert the energy of the water wave movements to the energy product.

At the block 1906, the method 1900 may include rotating the free-floating body via at least a second portion of the water exiting the free-floating body. Specifically, and as described in greater detail below with reference to FIG. 20, the fluid passage may be fluidly coupled to one or more assemblies. As an example, the at least the second portion of the water exiting the free-floating body may be released through the one or more assemblies in one or more respective pressurized and/or propelled streams to induce the rotation of the free-floating body. As an additional or alternative example, the at least the second portion of the water may pass through one or more turbines before being released from the free-floating body via the one or more assemblies, such that energy may be captured from the at least the second portion of the water, e.g., to be converted to a further energy product and/or to power a propulsion system (e.g., inboard and/or outboard propellors). In an example embodiment, translational motion of the free-floating body may be adjusted by rotating the free-floating body, as the rotation of the free-floating body may induce a Magnus effect resulting in a lift force which adjusts the translational motion of the free-floating body. As such, in certain embodiments, the translational motion of the free-floating body may be adjusted by rotating the free-floating body via actuation of the one or more assemblies without any additional auxiliary support from other components of the free-floating body (e.g., without directed translational propulsion induced by one or more additional outboard propellors generating a localized current in the body of water in an opposing direction of the translational motion, etc.).

At block 1908, the method 1900 may include transporting the energy product, e.g., to land, for storage or end use. Specifically, a supply chain may be established in which a transport or chain of transports (e.g., one or more tanker ships, land-based vehicles, etc.) may transport the energy product for storage in a watercraft or land-based storage facility or to an end user for consumption.

Figure 20:
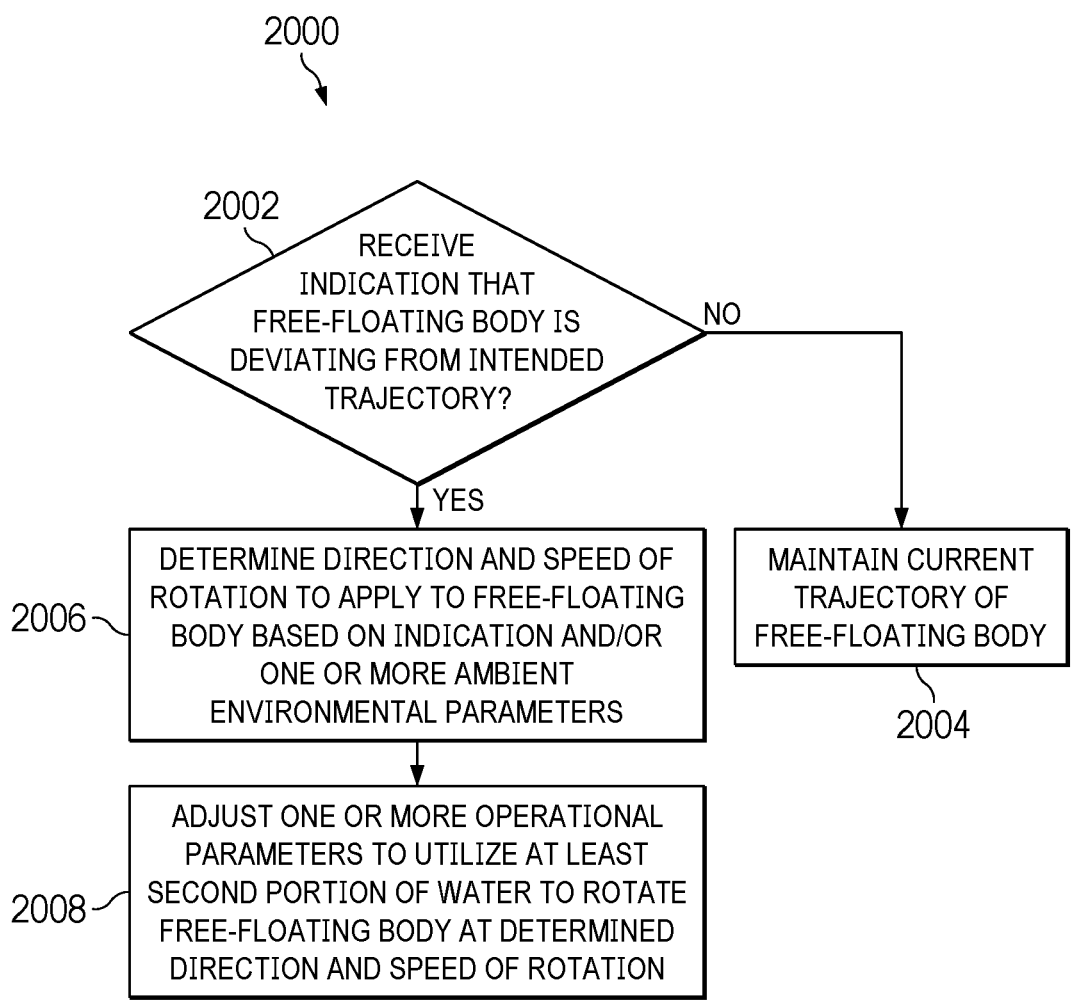
FIG. 20 shows a block diagram for a method for stationkeeping and/or adjusting a translational position of a free-floating body on a surface of a body of water, in accordance with at least one embodiment of the present disclosure.

Referring now to FIG. 20, a block diagram of a method 2000 for stationkeeping and/or adjusting a translational position of a free-floating body, such as any of the free-floating bodies or wave engines variously described in detail above with reference to FIGS. 1-18 and 21A-21D, on a surface of a body of water is shown. In an example embodiment, water exiting the free-floating body may be utilized to induce rotation of the free-floating body. As an example, the water may be released in one or more pressurized and/or propelled streams to induce the rotation of the free-floating body. As an additional or alternative example, at least a portion of energy by the free-floating body may be utilized to power a propulsion system to induce rotation of the free-floating body. In one embodiment, the method 2000 is performed as part of the method 1900 of FIG. 19, such as at the block 1906.

In some embodiments, the method 2000, or a portion thereof, may be implemented as executable instructions stored in non-transitory memory of a computing device, such as a controller communicably coupled to one or more actuators of the free-floating body. However, embodiments of methods for stationkeeping and/or adjusting translational positions of free-floating bodies are not limited to the below description of the method 2000. For instance, in certain embodiments, additional or alternative sequences of steps may be implemented, e.g., as executable instructions on such a computing device, where individual steps discussed with reference to the method 2000 may be added, removed, substituted, modified, or interchanged.

At block 2002, the method 2000 may include determining whether an indication that the free-floating body is deviating from an intended trajectory has been received. As an example, the free-floating body may deviate from the intended trajectory when the free-floating body is approaching (e.g., is within a threshold distance of) a boundary of a geographic area. As an additional or alternative example, the free-floating body may deviate from the intended trajectory as a result of a change in one or more ambient environmental parameters, such as wind, water wave movement, water currents, etc. As an additional or alternative example, the free-floating body may deviate from the intended trajectory when the free-floating body is commanded by an operator to move towards a designated location or area, e.g., to take advantage of favorable environmental conditions, to transiently couple to a ship or other free-floating body, to undergo maintenance, etc. As an additional or alternative example, the free-floating body may deviate from the intended trajectory when a permanent obstruction (e.g., a rock, an island, etc.) or a transient obstruction (e.g., a watercraft, debris, etc.) is identified along the intended trajectory. In certain embodiments, the indication may be received from a remote land-based controller.

If the indication that the free-floating body is deviating from the intended trajectory has not been received, the method 2000 may proceed to block 2004, where the method 2000 may include maintaining a current trajectory of the free-floating body. In such an example, rotation of the free-floating body may not be induced.

If the indication that the free-floating body is deviating from the intended trajectory has been received, the method 2000 may proceed to block 2006, where the method 2000 may include determining a direction of rotation and a speed of rotation to apply to the free-floating body based on the received indication and/or the one or more ambient environmental parameters. As an example, the direction of rotation and the speed of rotation may be selected so as to adjust the translational motion of the free-floating body to maintain the free-floating body within the geographic area (e.g., to perform stationkeeping within the geographic area). As an additional or alternative example, the direction of rotation and the speed of rotation may be selected so as to adjust the translational motion of the free-floating body to account for the change in the one or more ambient environmental parameters. As an additional or alternative example, the direction of rotation and the speed of rotation may be selected so as to adjust the translational motion of the free-floating body to move toward the designated location or area. As an additional or alternative example, the direction of rotation and the speed of rotation may be selected so as to adjust the translational motion of the free-floating body to avoid the permanent or transient obstruction. In certain embodiments, only one of the direction of rotation or the speed of rotation may be determined to be adjusted, e.g., if adjustment to only one of the direction of rotation or the speed of rotation would adjust the translational motion of the free-floating body as commanded.

At block 2008, the method 2000 may include adjusting one or more operational parameters of the free-floating body to utilize the at least the second portion of the water to rotate the free-floating body at the determined direction of rotation and the determined speed of rotation. Specifically, the at least the second portion of the water may be released in one or more pressurized and/or propelled streams to induce the rotation of the free-floating body and/or at least a portion of energy captured from the at least the second portion of the water may be utilized to power a propulsion system to induce the rotation of the free-floating body. In certain embodiments, rotation of the free-floating body may induce a Magnus effect resulting in a lift force which adjusts the translational motion of the free-floating body. As such, in at least one embodiment, the adjustment to the translational motion of the free floating body may be realized via the induced rotation of the free-floating body without further propulsion directing a localized current in the body of water opposite to a desired direction of the translational motion. In some embodiments, adjusting the translational motion of the free-floating body may include adjusting a direction of the translational motion of the free-floating body. In additional or alternative embodiments, adjusting the translational motion of the free-floating body may include adjusting a magnitude of the translational motion of the free-floating body.

The specification and drawings are to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

We claim:

1. A wave engine, comprising:
   a buoyant body having rotational symmetry about a vertical axis;
   a water reservoir incorporated into the buoyant body;
   a pair of outlet ports in fluid communication with the water reservoir and positioned on opposite sides of the buoyant body, said pair of outlets positioned to release water from the water reservoir in opposing, parallel directions; and
   at least one processor in communication with a a remote controller for automated positioning the wave engine; and controlling an amount of water released from the pair of outlet ports to induce rotation of the buoyant body:
   wherein the induced rotation of the buoyant body generates a Magnus effect resulting in a lift force which adjusts a direction of a translational motion of the wave engine in accordance with the positioning from the remote controller.

2. The wave engine of claim 1, wherein the pair of outlet ports protrude from the buoyant body.

3. The wave engine of claim 1, wherein the buoyant body includes a second reservoir configured for storing an energy product.

4. The wave engine of claim 3, wherein the energy product is hydrogen.

5. The wave engine of claim 3, wherein the energy product is a fuel.

6. The wave engine of claim 1, wherein said processor cooperates with the pair of outlet ports to control a rotational speed of the wave engine.

7. The wave engine of claim 1, wherein the pair of outlet ports comprise three way valves.

8. The wave engine of claim 1, further comprising first and second turbines disposed at a respective ones of the first and second outlet ports for developing power from water escaping through the respective outlet port.

9. The wave engine of claim 1, further comprising mechanical devices for rotationally propelling the wave engine.

10. The wave engine of claim 9, wherein the mechanical devices are propellers.

* * * * *